United States Patent
Takeuchi et al.

(10) Patent No.: US 12,350,715 B2
(45) Date of Patent: Jul. 8, 2025

(54) OPTICAL SORTER, SORTING SIMULATION APPARATUS, AND SIMULATION METHOD REGARDING SORTING OF SORTING TARGET USING OPTICAL SORTER

(71) Applicant: SATAKE CORPORATION, Tokyo (JP)

(72) Inventors: Hiroaki Takeuchi, Tokyo (JP); Hiroki Ishizuki, Tokyo (JP); Tomoyuki Miyamoto, Tokyo (JP); Hironori Arii, Tokyo (JP)

(73) Assignee: SATAKE CORPORATION, Tokyo (JP)

( * ) Notice: Subject to any disclaimer, the term of this patent is extended or adjusted under 35 U.S.C. 154(b) by 0 days.

(21) Appl. No.: 18/566,396

(22) PCT Filed: Mar. 30, 2022

(86) PCT No.: PCT/JP2022/015924
§ 371 (c)(1),
(2) Date: Dec. 1, 2023

(87) PCT Pub. No.: WO2022/254936
PCT Pub. Date: Dec. 8, 2022

(65) Prior Publication Data
US 2024/0261822 A1    Aug. 8, 2024

(30) Foreign Application Priority Data
Jun. 2, 2021 (JP) .............................. 2021-092936

(51) Int. Cl.
*B07C 5/342* (2006.01)
*B07C 5/36* (2006.01)

(52) U.S. Cl.
CPC ............ *B07C 5/3425* (2013.01); *B07C 5/361* (2013.01); *B07C 5/368* (2013.01); *B07C 2501/0081* (2013.01)

(58) Field of Classification Search
CPC ......... B07C 5/34; B07C 5/342; B07C 5/3425; B07C 5/361; B07C 5/368; B07C 2501/0081

(Continued)

(56) References Cited

U.S. PATENT DOCUMENTS 8,569,644 B2 * 10/2013 Nierle .................. G01N 21/359
                                                    250/341.7
2009/0050540 A1    2/2009 Imai et al.
2017/0350825 A1 * 12/2017 Ishizuki ................ B07C 5/3425

FOREIGN PATENT DOCUMENTS

CN          112759421 A   *  5/2021
EP          4079418 A1    * 10/2022  ........... B07C 5/3425

(Continued)

OTHER PUBLICATIONS

International Preliminary Report on Patentability for corresponding Application No. PCT/JP2022/015924, issued on Nov. 21, 2023, with English translation.

(Continued)

*Primary Examiner* — Terrell H Matthews
(74) *Attorney, Agent, or Firm* — Renner, Otto, Boisselle & Sklar, LLP.

(57) ABSTRACT

Controller of an optical sorter is configured to receive an input of a candidate for a target quality condition regarding an allowable mix rate of defective products in sorting targets discharged from the optical sorter as acceptable products, receive an input of quality information indicating a mix rate of the defective products regarding at least a part of the sorting targets, simulate, based on the information, a sorting result regarding a quantity and/or a yield of the sorting targets discharged as the acceptable products that is expected to be acquired when sorting is conducted by a sorting device to achieve the candidate for the target quality condition and output a result of the simulation, receive an input of a final target quality condition to be employed when conducting the sorting, and conduct the sorting based on a sorting control parameter that allows the final target quality condition to be achieved.

12 Claims, 7 Drawing Sheets

(58) Field of Classification Search
USPC .......................................................... 209/577
See application file for complete search history.

(56) References Cited

FOREIGN PATENT DOCUMENTS

| | | | | |
|---|---|---|---|---|
| JP | 1984190383 | U | | 12/1984 |
| JP | 06106137 | A | * | 9/1992 |
| JP | H06106137 | A | | 4/1994 |
| JP | H08201301 | A | | 8/1996 |
| JP | 10216650 | A | * | 8/1998 |
| JP | H10216650 | A | | 8/1998 |
| JP | 2006177691 | A | * | 7/2006 |
| JP | 2009050760 | A | | 3/2009 |
| JP | 5035696 | B2 | | 9/2012 |
| JP | 5071712 | B2 | | 11/2012 |
| JP | 2013108568 | A | | 6/2013 |
| JP | 2016118455 | A | | 6/2016 |
| JP | 2016125867 | A | | 7/2016 |

OTHER PUBLICATIONS

International Search Report for corresponding Application No. PCT/JP2022/015924, issued Jun. 8, 2022, with English translation.
Written Opinion for corresponding Application No. PCT/JP2022/015924, issued Jun. 8, 2022, Japanese language only.

* cited by examiner

FIG. 7

| | PROCESSING QUANTITY (kg) | | | MATERIAL QUALITY (%) | | | | | | |
|---|---|---|---|---|---|---|---|---|---|---|
| | INTRODUCED QUANTITY | ACCEPTABLE PRODUCT | DEFECTIVE PRODUCT | PERFECT GRAIN | DEAD RICE | COLORED GRAIN | UNHULLED RICE | WHEAT | ANOTHER DIFFERENT KIND OF GRAIN | FOREIGN OBJECT |
| PRIMARY SORTING | A | Q=A−I | R=I | B | C | D | E | F | G | H |
| SECONDARY SORTING | I | | | J | K | L | M | N | O | P |
| OUTPUT PRODUCT | | S=A−I | | T= (A*B−I*J)/S | U= (A*C−I*K)/S | V= (A*D−I*L)/S | W= (A*E−I*M)/S | X= (A*F−I*N)/S | Y= (A*G−I*O)/S | Z= (A*H−I*P)/S |

OPTICAL SORTER, SORTING SIMULATION APPARATUS, AND SIMULATION METHOD REGARDING SORTING OF SORTING TARGET USING OPTICAL SORTER

This application is a national phase of International Application No. PCT/JP2022/015924 filed Mar. 30, 2022, which claims priority to Japanese Application No. 2021-092936 filed Jun. 2, 2021, each of which is hereby incorporated herein by reference in its entirety.

TECHNICAL FIELD

The present disclosure relates to a sorting technique of an optical sorter.

BACKGROUND

When buyers buy rice from farmers, the grade of the rice is determined visually or based on a result of sample measurement using a grain analyzer. The grading is defined as the Agricultural Products Inspection Standards in such a manner that the first grade, the second grade, and the third grade are assigned in descending order of quality according to a mix rate of defective products. The rice is sold higher as the grade of the rice is higher, which motivates the farmers to aim to ship the first-grade rice. Further, a higher profit can be earned as the product yield increases, which motivates the farmers to aim to output a high yield.

Under these circumstances, conventionally, defective products have been removed from rice before shipment using an optical sorter to improve the quality of the rice as a product. Further, Japanese Patent Nos. 5035696 and 5071712 disclose techniques for improving a product yield by intentionally removing only a part of cracked rice grains instead of removing all of the cracked rice grains. More specifically, Japanese Patent No. 5035696 discloses a sorter that removes only rice accounting for a preset percentage of rice determined to be cracked rice. Further, Japanese Patent No. 5071712 discloses a sorter that removes only cracked rice having a crack length equal to or longer than a preset threshold value.

SUMMARY

However, the optical sorters discussed in Japanese Patent Nos. 5035696 and 5071712 leave room for improvement in terms of quality control. For example, a user has to preset how much cracked rice is removed among rice determined to be cracked rice, but may fail to set an appropriate removal rate because being unable to know what kind of quality and how high yield the acquired product can achieve by the sorting processing before the sorting processing.

Further, generally, the product quality and the yield are in a trade-off relationship, and therefore it cannot be said that improving the quality as high as possible necessarily leads to high profitability. For example, if the harvested rice is low in quality (i.e., the mix rate of defective products is considerably high), removing a large number of defective products to improve the grade leads to a significant reduction in the yield, thereby raising a possibility that the profit declines on the contrary as a result.

These circumstances have led to a demand for improving the quality control in optical sorters. The above-described problem is not limited to rice, and is also shared among any kinds of granular objects (for example, any grains different from rice, and resin).

The present disclosure has been made to solve at least a part of the above-described problems, and can be realized as, for example, the following aspects.

According to a first aspect of the present disclosure, an optical sorter is provided. This optical sorter includes a light source configured to irradiate a sorting target in transit with light, an optical sensor configured to detect the light emitted from the light source and associated with the sorting target, a sorting device configured to sort out at least a part of sorting targets determined to be defective products based on a signal acquired by the optical sensor, and a controller configured to control an operation of the optical sorter. The controller is configured to receive an input of a candidate for a target quality condition regarding an allowable mix rate of the defective products in sorting targets discharged from the optical sorter as acceptable products, receive an input of quality information indicating a mix rate of the defective products regarding at least a part of the sorting targets, simulate, based on the quality information, a sorting result regarding a quantity and/or a yield of sorting targets discharged as the acceptable products that is expected to be acquired when the sorting is conducted by the sorting device so as to achieve the candidate for the target quality condition and output a result of the simulation, receive an input of a final target quality condition to be employed when conducting the sorting by the sorting device, and conduct the sorting based on a sorting control parameter that allows the final target quality condition to be achieved.

The "light associated with the sorting target" may be reflected light that is light reflected on the sorting target, transmitted light that is light transmitted through the sorting target, or both the reflected light and the transmitted light. Alternatively, the "light associated with the sorting target" can include light generated due to fluorescent emission when the sorting target including a fluorescent substance is irradiated with the light instead of or in addition to the reflected light and/or the transmitted light. The "sorting targets discharged as acceptable products" are not limited to an acceptable product and may also include a defective product determined to be unnecessary to be sorted out (removed).

According to this optical sorter, a user can confirm the simulation result regarding the quantity and/or the yield of the sorting targets discharged as the acceptable products that is expected to be acquired when the candidate for the target quality condition is employed, before starting the sorting operation. Therefore, the user can determine, based on the simulation result, the final target quality condition to be employed in consideration of the quantity and/or the yield of the sorting targets discharged as the acceptable products. Therefore, the user can acquire the sorting targets satisfying a desirable quality and yield.

According to a second aspect of the present disclosure, in the first aspect, the controller is configured to control the sorting device so as to sort out only a part of the sorting targets determined to be the defective products. The sorting control parameter includes a setting value regarding a sorting rate, which is a percentage of sorting targets targeted to be sorted out among the sorting targets determined to be the defective products. According to this aspect, the mix rate of the defective products can be directly controlled, and this facilitates control of the quality and the yield so as to satisfy the final target quality condition.

According to a third aspect of the present disclosure, in the first or second aspect, the sorting control parameter includes a threshold value for determining the defective products. According to this aspect, the number of sorting targets determined to be the defective products can be controlled, and therefore the quality and the yield can be controlled.

According to a fourth aspect of the present disclosure, in any of the first to third aspects, the sorting device includes a plurality of nozzles configured to selectively eject air. The plurality of nozzles is arranged in a direction perpendicular to a conveyance direction of the sorting target. The sorting device is configured to sort out the at least a part of the sorting targets determined to be the defective products by selectively ejecting the air to the sorting target from the plurality of nozzles. The controller is configured to variably set a range in which the air is ejected to the sorting target. The sorting control parameter includes a setting regarding the range in which the air is ejected.

The "range in which the air is ejected" to the sorting target is not limited to a range in which the air is ejected at some moment and refers to a range in a coordinate system that moves together with the sorting target in transit. For example, the relative positional relationship between the sorting target in transit and the region in which the air is ejected changes according to the conveyance of the sorting target from moment to moment, and an entire coordinate region hit by the air even for a second in the coordinate system that moves together with the sorting target can be the "range in which the air is ejected" to the sorting target. Such a range in which the air is ejected can be changed by, for example, changing the ejection period. Alternatively, the range in which the air is ejected can be changed by changing the number of nozzles controlled to eject the air among the plurality of nozzles. More specifically, the range in which the air is ejected can be changed depending on whether to eject the air from one nozzle among the plurality of nozzles or eject the air from one nozzle and a nozzle adjacent to this one nozzle. In other words, the "setting regarding the range in which the air is ejected" may be a setting of the ejection period, may be a setting regarding assignment of an ejection responsibility range with respect to a position at which the sorting target is detected in a direction in which the plurality of nozzles is arranged, or may be both of them.

According to the fourth aspect, the accuracy of removing the defective product or the frequency of occurrence of a collateral unintentional removal (when the air is ejected to a sorting target intended to be removed, a sorting target located adjacent to this sorting target intended to be removed is removed together) can be controlled, and therefore the quality and the yield can be controlled.

According to a fifth aspect of the present disclosure, in any of the first to fourth aspects, the optical sorter includes a primary sorting system and a secondary sorting system. Each of the primary sorting system and the secondary sorting system is configured to conduct optical sorting using the light source, the optical sensor, and the sorting device. The optical sorter is configured in such a manner that the sorting targets introduced into the primary sorting system are sorted into a first sorted group and a second sorted group, the first sorted group is discharged from the primary sorting system as the acceptable products, the secondary sorted group is introduced into the secondary sorting system, and the second sorted group is sorted into a third sorted group and a fourth sorted group in the secondary sorting system. Further, the optical sorter satisfies at least one of being configured to switch a discharge destination of the third sorted group between reintroduction into the primary sorting system and discharge as the acceptable products, and being configured to switch a discharge destination of the fourth sorted group between discharge as the acceptable products and discharge as the defective products. The sorting control parameter includes a setting regarding the discharge destination(s) of the third sorted group and/or the fourth sorted group. According to this aspect, the quality and the yield can be controlled by changing the discharge destination(s) of the third sorted group and/or the fourth sorted group.

According to a sixth aspect of the present disclosure, in any of the first to fifth aspects, the controller is configured to detect a mix state of the defective products in the sorting targets in a predetermined period based on the signal acquired by the optical sensor and change the sorting control parameter based on the mix state during a sorting operation. The actual mix state of the defective products and the quality information do not necessarily match each other, but, according to the present aspect, the sorting control parameter can be changed according to the actual mix state of the defective products. Therefore, the target quality condition can be further reliably achieved.

According to a seventh aspect of the present disclosure, in the sixth aspect, the controller is configured to calculate a sorting result regarding the target quality condition in the predetermined period based on the mix state and change the sorting control parameter based on the calculated sorting result during the sorting operation. According to this aspect, the quality of the sorting targets discharged from the optical sorter as the acceptable products can be calculated based on the actual mix state of the defective products and the setting of the sorting control parameter. Then, the present configuration allows the sorting control parameter to be changed according to whether the final target quality condition can be achieved, which is confirmed from the result of the calculation, during the sorting operation. Therefore, feedback control can be performed so as to allow actual sorting processing to have a sorting result closer to the final target quality condition.

According to an eighth aspect of the present disclosure, in the seventh aspect including the fifth aspect, the controller is configured to calculate the sorting result regarding the target quality condition in the predetermined period based on the signal acquired in each of the primary sorting system and the secondary sorting system during the sorting operation. The sorting targets discharged from the primary sorting system as the acceptable products are acquired by subtracting the sorting targets introduced into the secondary sorting system from the sorting targets introduced into the primary sorting system. Therefore, according to the present aspect, the quality of the sorting targets discharged from the primary sorting system as the acceptable products can be further correctly confirmed based on the actual qualities of the sorting targets respectively introduced into the primary sorting system and the secondary sorting system.

According to a ninth aspect of the present disclosure, in the seventh or eighth aspect, the controller is configured to change the sorting control parameter in a direction for allowing the calculated sorting result to indicate a quality closer to the final target quality condition when the quality indicated by the calculated sorting result falls below the final target quality condition by a predetermined degree. According to this configuration, the final target quality condition can be reliably achieved.

According to a tenth aspect of the present disclosure, in any of the seventh to ninth aspects, the controller is configured to change the sorting control parameter in a direction for improving a yield of the sorting targets discharged as the acceptable products when a quality indicated by the calculated sorting result exceeds the final target quality condition by a predetermined degree. According to this aspect, the yield can be improved while the final target quality condition can be achieved.

According to an eleventh aspect of the present disclosure, a sorting simulation apparatus is provided. This sorting simulation apparatus includes a controller. The controller is configured to receive an input of a candidate for a target quality condition regarding an allowable mix rate of defective products in sorting targets discharged from the optical sorter as acceptable products when sorting the sorting targets using an optical sorter, receive an input of quality information indicating a mix rate of the defective products regarding at least a part of the sorting targets, and simulate, based on the quality information, a sorting result regarding a quantity and/or a yield of sorting targets discharged as the acceptable products that is expected to be acquired when the sorting is conducted by the optical sorter so as to achieve the candidate for the target quality condition, and output a result of the simulation. According to this sorting simulation apparatus, advantageous effects similar to the first aspect can be brought about.

According to a twelfth aspect of the present disclosure, a simulation method regarding sorting of a sorting target using an optical sorter is provided. This method includes causing a user to determine a candidate for a target quality condition regarding an allowable mix rate of defective products in sorting targets discharged from the optical sorter as acceptable products, acquiring quality information indicating a mix rate of the defective products regarding at least a part of the sorting targets, simulating, based on the quality information, a sorting result regarding a quantity and/or a yield of sorting targets discharged as the acceptable products that is expected to be acquired when the sorting is conducted by the optical sorter so as to achieve the candidate for the target quality condition and presenting the sorting result to the user, causing the user to determine a final target quality condition to be employed when conducting the sorting by the optical sorter, and conducting the sorting by the optical sorter based on a sorting control parameter that allows the final target quality condition to be achieved. According to this method, advantageous effects similar to the first aspect can be brought about.

According to a thirteenth aspect of the present disclosure, an optical sorter is provided. This optical sorter includes a light source configured to irradiate a sorting target in transit with light, an optical sensor configured to detect the light emitted from the light source and associated with the sorting target, a sorting device configured to sort out at least a part of sorting targets determined to be the defective products based on a signal acquired by the optical sensor, and a controller configured to control an operation of the optical sorter. The controller is configured to receive an input of quality information indicating a mix rate of the defective products regarding at least a part of the sorting targets, for each of a plurality of candidates for a target quality condition regarding an allowable mix rate of the defective products in sorting targets discharged from the optical sorter as acceptable products, simulate, based on the quality information, a sorting result regarding a quantity and/or a yield of the sorting targets discharged as the acceptable products that is expected to be acquired when the sorting is conducted by the optical sorter so as to achieve the candidate for the target quality condition, determine, based on a result of the simulation, a final target quality condition to be employed when conducting the sorting by the sorting device, and conduct the sorting based on a sorting control parameter that allows the final target quality condition to be achieved.

The plurality of candidates for the target quality condition may be predetermined and stored in a memory of the optical sorter, or the plurality of candidates for the target quality condition may be input by a user and the controller may receive inputs thereof. The controller may determine to set a candidate for the target quality condition that maximizes the yield as the final target quality condition, or may calculate a predicted value of product sales by multiplying the quantity of the sorting targets discharged as the acceptable products by a predetermined product unit price and determine to set a candidate for the target quality condition that maximizes the predicted value of product sales as the final target quality condition. The controller may automatically conduct the sorting after determining the final target quality condition, or may output the simulation result and/or a predicted value of product sales on an image display device to present the simulation result and/or a predicted value of product sales to a user, and conduct the sorting after receiving an instruction to conduct the sorting from the user.

According to this optical sorter, the controller can conduct the sorting after setting an optimum sorting control parameter that increases the yield or the predicted value of product sales as much as possible. Any of the second to tenth aspects can also be added to the thirteenth aspect.

According to a fourteenth aspect of the present disclosure, an optical sorter is provided. This optical sorter includes a light source configured to irradiate a sorting target in transit with light, an optical sensor configured to detect the light emitted from the light source and associated with the sorting target, a sorting device configured to sort out at least a part of sorting targets determined to be the defective products based on a signal acquired by the optical sensor, and a controller configured to control an operation of the optical sorter. The controller is configured to receive an input of a target quality condition regarding an allowable mix rate of the defective products in the sorting targets discharged from the optical sorter as acceptable products, and detect a mix state of the defective products in the sorting targets in a predetermined period based on the signal acquired by the optical sensor and change a sorting control parameter based on the mix state and the target quality condition during a sorting operation. According to this optical sorter, the sorting control parameter can be set so as to achieve the target quality condition according to the actual mix state of the defective products. Therefore, the target quality condition can be reliably achieved. Any of the seventh to tenth aspects can also be added to the fourteenth aspect.

BRIEF DESCRIPTION OF THE DRAWINGS

FIG. 7 is a table illustrating one example of a method for calculating a sorting result based on signals acquired by optical sensors.

DETAILED DESCRIPTION OF THE EMBODIMENTS

Figure 1:
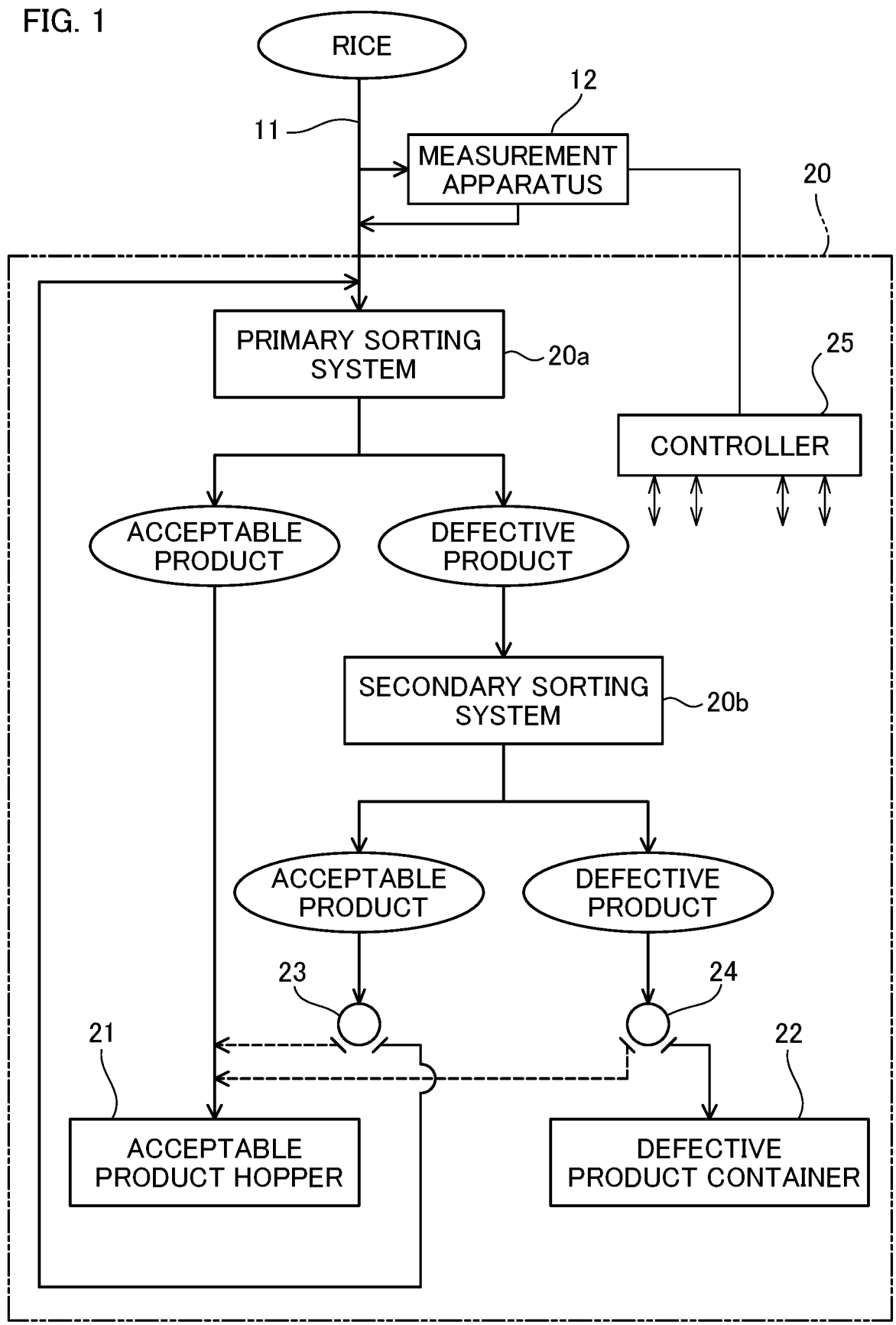
FIG. 1 is a block diagram illustrating a flow of a sorting target in an optical sorter according to one embodiment of the present disclosure.

FIG. 1 is a schematic view illustrating an overview of the configuration of an optical sorter (hereinafter simply referred to as a sorter) 20 as one embodiment of the present disclosure. In the present embodiment, the sorter 20 is used to sort out a defective product (meaning a grain that is not a perfect grain, and including, for example, an immature grain, a colored grain, and a foreign object (for example, a small stone, mud, and a glass piece)) from rice grains (more specifically, brown rice) set as one example of sorting targets 90.

As illustrated in FIG. 1, the sorter 20 is configured to receive the sorting targets 90 from a conveyance line 11. The conveyance line 11 conveys the brown rice (the sorting targets 90) husked by a husker (not illustrated) from the husker to the sorter 20.

A measurement apparatus 12 is set up on the way of the conveyance line 11. The measurement apparatus 12 includes a sample collection mechanism, a camera, and a determination unit. The sample collection mechanism automatically collects a part of the sorting targets 90 conveyed by the conveyance line 11 as samples. Any known mechanism can be used as the sample collection mechanism. The sample collection mechanism may be, for example, a chute including a shutter capable of opening and closing a communication state with the conveyance line 11. In this case, a part of the sorting targets 90 on the conveyance line 11 may fall onto the chute and be supplied to the measurement apparatus 12 when the shutter is opened. Alternatively, the sample collection mechanism may be a robot arm.

The camera of the measurement apparatus 12 images the collected samples and acquires image data. The determination unit of the measurement apparatus 12 measures quality information of the sorting targets 90 based on the image data. The quality information here refers to a mix rate of defective products in the samples (a ratio by weight in the present embodiment). In the present embodiment, the defective product is defined in compliance with the Agricultural Products Inspection Standards established by the Agricultural Products Inspection Act. More specifically, the defective product refers to a damaged grain, dead rice, a colored grain, a different kind of grain, and a foreign object. The damaged grain refers to a grain that has incurred damage, and includes, for example, a cracked grain and a broken grain. The different kind of grain refers to a grain other than brown rice. The foreign object refers to an object other than a grain.

More specifically, the determination unit determines for each rice grain whether this rice is a perfect grain or a defective product (more specifically, which type of defective product this rice is). As widely known, this determination is made by, for example, comparing a tone value of the image data and a preset threshold value. The function of the determination unit is realized by, for example, execution of a predetermined program stored in a memory by a CPU. In the present embodiment, the samples measured by the measurement apparatus 12 are returned to the conveyance line 11.

A grain analyzer may be used as such a camera and determination unit. The grain analyzer is well-known, and may be, for example, an apparatus discussed in Japanese Patent Application Laid-Open No. 2016-125867, Japanese Patent Application Laid-Open No. 2016-118455, or U.S. Patent Application Publication No. 2017/350825. The disclosures thereof are incorporated herein by reference in its entirety.

In the present embodiment, the measurement apparatus 12 is electrically connected to a controller 25 of the sorter 20, and the quality information acquired by the measurement apparatus 12 is output to the controller 25. The controller 25 controls the overall operation of the sorter 20. The function of the controller 25 may be realized by execution of a predetermined program by the CPU, may be realized by a dedicated circuit, or may be realized by a combination of them. Each function of the controller 25 may be realized by a single integrated device. For example, each function of the controller 25 may be realized by one CPU. Alternatively, each function of the control unit 25 may be distributed to at least two devices. For example, the controller 25 may include a dedicated controller for a primary sorting system 20a, which will be described below, a dedicated controller for a secondary sorting system 20b, and a controller that presides over them.

The measurement apparatus 12 may be provided in the sorter 20 instead of being provided in the conveyance line 11. In this case, the measurement apparatus 12 is disposed on the upstream side of the primary sorting system 20a in the flow of the sorting target 90 in the sorter 20.

Figure 2:
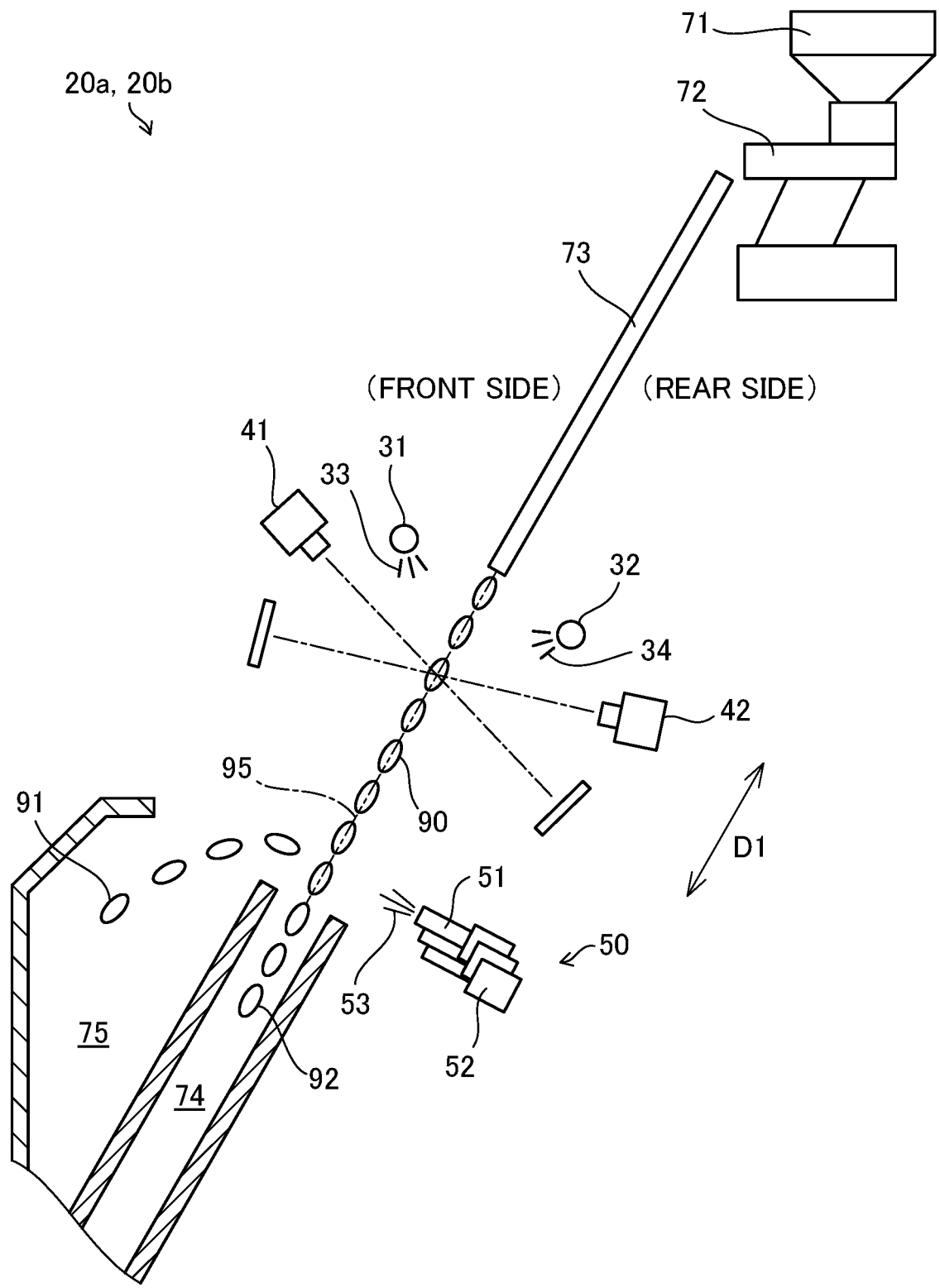
FIG. 2 is a schematic view illustrating an outline of the configuration of a primary sorting system and a secondary sorting system.

As illustrated in FIG. 1, the sorter 20 includes the primary sorting system 20a and the secondary sorting system 20b. In the present embodiment, the primary sorting system 20a and the secondary sorting system 20b have identical apparatus structures. For this reason, in the following description, the present embodiment will be described with reference to FIG. 2, focusing on the outline of the configuration of the primary sorting system 20a on behalf of the primary sorting system 20a and the secondary sorting system 20b. As illustrated in FIG. 2, the primary sorting system 20a includes light sources 31 and 32, optical sensors 41 and 42, a sorting device 50, a storage tank 71, a feeder 72, a chute 73, an acceptable product discharge gutter 74, and a defective product discharge gutter 75.

The storage tank 71 temporarily stores the sorting target 90 therein. The feeder 72 feeds the sorting target 90 stored in the storage tank 71 onto the chute 73 serving as one example of a sorting target conveyance means. The sorting target 90 fed onto the chute 73 slides on the chute 73 downward, and falls from the lower end of the chute 73. The chute 73 has a predetermined width to allow a large number of sorting targets 90 to fall at the same time. In the following description, a direction in which the sorting target 90 is conveyed after falling from the chute 73 (i.e., a falling direction of the sorting target 90) will be referred to as a conveyance direction D1. Further, a direction perpendicular to the conveyance direction D1 (i.e., a width direction of the chute 73) will be referred to as a perpendicular direction D2.

The light source 31 is disposed on one side (referred to as a front side) with respect to a conveyance route 95 of the sorting target 90 (i.e., a falling trajectory of the sorting target 90), and the light source 32 is disposed on the other side (referred to as a rear side) with respect to the conveyance route 95 of the sorting target 90. The light sources 31 and 32 irradiate the sorting target 90 that is being conveyed on the conveyance route 95 (i.e., the sorting target 90 after sliding down from the chute 73) with light 33 and light 34, respectively. In the present embodiment, each of the light sources 31 and 32 includes a plurality of LEDs that emits red light, a plurality of LEDs that emits green light, a plurality of LEDs that emits blue light, and a plurality of LEDs that emits near-infrared light. However, the specifications of the light sources 31 and 32 (for example, the number, the light emission method, and the wavelength ranges of the light 33 and 34) are not especially limited. For example, only an LED that emits visible light or only an LED that emits near-infrared light may be used as the light source(s) 31 and/or 32. Alternatively, the LEDs that emit the near-infrared light may be disposed on only one of the front side and the rear side. Alternatively, one of the light sources 31 and 32 may be omitted.

The optical sensor 41 is disposed on the front side, and the optical sensor 42 is disposed on the rear side. The optical sensors 41 and 42 detect the light emitted from the light sources 31 and 32 and associated with the sorting target 90. More specifically, the optical sensor 41 on the front side can detect the light 33 emitted from the light source 31 on the front side and reflected on the sorting target 90 and the light 34 emitted from the light source 32 on the rear side and transmitted through the sorting target 90. The optical sensor 42 on the rear side can detect the light 34 emitted from the light source 32 on the rear side and reflected on the sorting target 90 and the light 33 emitted from the light source 31 on the front side and transmitted through the sorting target 90.

In the present embodiment, each of the optical sensors 41 and 42 is a color CCD sensor and a near-infrared sensor, and includes a plurality of linearly arranged light receiving elements. The plurality of light receiving elements is arranged in the perpendicular direction D2 (i.e., the width direction of the chute 73). Therefore, the optical sensors 41 and 42 can image a large number of sorting targets 90 conveyed while spreading across over the predetermined width of the chute 73 at the same time. The specifications of the optical sensors 41 and 42 are not especially limited, and can be determined in any manner according to the specifications of the light sources 31 and 32. Further, one of the optical sensors 41 and 42 may be omitted.

An output from each of the optical sensors 41 and 42, i.e., an analog signal indicating a detected light intensity is amplified with a predetermined gain and is further converted into a digital signal by an AC/DC converter (not illustrated). This digital signal (i.e., a tone value corresponding to the analog signal) is input to the controller 25 (refer to FIG. 1). The controller 25 discriminates a defective product among the sorting targets 90 based on the input result of the detection of the light (i.e., an image). More specifically, the controller 25 compares the tone value of the image (i.e., the density of the image) corresponding to a color (a wavelength) predetermined for each type of defective product and a threshold value predetermined for each type of defective product (hereinafter referred to as a density threshold value), and determines whether the sorting target 90 is a perfect grain or a defective product based on the magnitude relationship therebetween. Alternatively, the controller 25 determines whether each pixel in the image indicating the sorting target 90 indicates a defective product by a similar comparison. This determination can be made using an image based on at least one of the reflected light 33, the transmitted light 34, and light acquired by combining the reflected light 33 and the transmitted light 34 detected by the optical sensor 41, and the reflected light 34, the transmitted light 33, and light acquired by combining the reflected light 33 and the transmitted light 34 detected by the optical sensor 42. Further, a threshold value regarding the size of a defective portion (a pixel indicating a defect) (hereinafter referred to as a size threshold value) may be set for a specific type of defective product. For example, for a cracked grain, a size threshold value regarding the length of the crack may be set, and only a sorting target 90 having a crack length equal to or longer than the size threshold value may be determined to be a cracked grain. Further, for a broken grain, a size threshold value regarding a grain size (for example, an area or a length) may be set, and only a sorting target 90 having a grain size equal to or smaller than the size threshold value may be determined to be a broken grain. Further, for an arbitrary type of defective product different from the broken grain, the size threshold value may also be set and only a sorting target 90 having a defective portion equal to or larger than the size threshold value may be determined to be a defective product.

The sorting device 50 ejects air toward at least a part of the sorting target 90 determined to be a defective product, thereby sorting out this sorting target 90. More specifically, the sorting device 50 includes a plurality of nozzles 51 and the number of valves 52 corresponding to the nozzles 51 (the number of valves 52 is the same as the number of nozzles 51 in the present embodiment, but may be different from the number of nozzles 51). The plurality of nozzles 51 is arranged in the perpendicular direction D2 (i.e., the width direction of the chute 73). For example, piezo valves or electromagnetic valves can be used as the valves 52.

The plurality of nozzles 51 is connected to a compressor (not illustrated) via the plurality of valves 52, respectively. The plurality of valves 52 is selectively opened according to a control signal from the controller 25, by which the plurality of nozzles 51 selectively ejects the air 53 toward the sorting target 90. More specifically, ejection responsibility ranges with respect to each position at which the sorting target 90 is detected in the perpendicular direction D2 are associated with the plurality of nozzles 51, respectively. Then, each of the plurality of nozzles 51 ejects the air 53 when a defective product (or a defective portion in a defective product) is located in the corresponding ejection responsibility range, or when a predetermined position (for example, the center) of a defective product (or a defective portion in a defective product) is located in the corresponding ejection responsibility range. In this manner, each of the plurality of nozzles 51 is assigned a range where the nozzle 51 is set to be responsible for the ejection of the air 53 with respect to each position at which the sorting target 90 is detected in the perpendicular direction D2. Actually, the ejection responsibility range is defined based on a position in the perpendicular direction D2 in the image input to the controller 25.

The air 53 is ejected to a whole or part of the sorting target 90 determined to be a defective product (whether the air 53 is ejected to a whole or part of the sorting target 90 will be described below). The sorting target 90 with the air 53 ejected thereto is blown off by the air 53, and is deviated from the falling trajectory from the chute 73 (i.e., the conveyance route 95) and guided to the defective product discharge gutter 75 (represented as a sorting target 91 in FIG. 2). On the other hand, the air 53 is not ejected toward the sorting target 90 determined to be a perfect grain. Therefore, the perfect grain is guided to the acceptable product discharge gutter 74 as an acceptable product without changing the falling trajectory thereof (represented as a sorting target 92 in FIG. 2). As seen from the above description, the "acceptable product" guided to the acceptable product discharge gutter 74 can include a non-perfect grain failed to be blown off by the air 53 besides the perfect grain. Further, if the ejection of the air 53 causes such a phenomenon that a sorting target 90 located around the sorting target 90 intended to be removed is removed together (the above-described collateral unintentional removal), the sorting target 90 intended to be discharged as an acceptable product (i.e., a perfect grain) ends up being discharged as a defective product. Therefore, the "defective product" guided to the defective product discharge gutter 75 can also include a perfect grain.

The conveyance route of the sorting target 90 may be changed by ejecting the air 53 toward the sorting target 90 that is sliding on the chute 73, instead of the configuration that ejects the air 53 toward the sorting target 90 after the sorting target 90 falls from the chute 73. Further, a belt conveyor may be employed as the sorting target conveyance means instead of the chute 73. In this case, air may be ejected toward the sorting target that is falling from one end of the belt conveyor. Alternatively, air may be ejected toward the sorting target that is being conveyed on the belt conveyor.

Now, the present embodiment will be further described, referring back to FIG. 1. The sorting target 90 discharged as an acceptable product from the primary sorting system 20a (more specifically, the acceptable product discharge gutter 74) is stored in an acceptable product 21 hopper. The sorting target 90 in the acceptable product 21 hopper is supplied to a facility set up for a process subsequent thereto (for example, a weighing and packing apparatus). On the other hand, the sorting target 90 discharged as a defective product from the primary sorting system 20a (more specifically, the defective product discharge gutter 75) is introduced into the secondary sorting system 20b. The sorting target 90 introduced into the secondary sorting system 20b is sorted in a manner similar to the primary sorting system 20a.

In the present embodiment, the sorter 20 is configured to switch, with a switching valve 23, the discharge destination of the sorting target 90 discharged from the secondary sorting system 20b as an acceptable product. More specifically, this discharge destination can be switched between reintroduction into the primary sorting target 20a (indicated by an arrowed solid line in FIG. 1) and discharge as an acceptable product (indicated by an arrowed dotted line in FIG. 1), i.e., discharge to the acceptable product 21 hopper. A user can perform such an operation of switching the discharge destination using a user interface. Under normal circumstances, this discharge destination is set to the reintroduction into the primary sorting system 20a. According to this setting, the sorting target 90 collaterally unintentionally removed in the primary sorting system 20a can be introduced into the primary sorting system 20a again and collected as an acceptable product in the end. This can result in improvement of the yield of sorting targets 90 collected as acceptable products.

Further, the sorter 20 is configured to switch, with a switching valve 24, the discharge destination of the sorting target 90 discharged from the secondary sorting system 20b as a defective product. More specifically, this discharge destination can be switched between discharge as an acceptable product (indicated by an arrowed dotted line in FIG. 1), i.e., discharge to the acceptable product 21 hopper, and discharge as a defective product (indicated by an arrowed solid line in FIG. 1), i.e., discharge to a defective product container 22. The user can perform such an operation of switching the discharge destination using the user interface. Under normal circumstances, this discharge destination is set to the discharge to the defective product container 22.

In the present embodiment, the sorting accuracy of the secondary sorting system 20b is set to a lower level than the sorting accuracy of the primary sorting system 20a. In other words, a mix rate of defective products in the sorting targets 90 discharged from the secondary sorting system 20b as acceptable products than a mix rate of defective products in the sorting targets 90 discharged from the primary sorting system 20a as acceptable products. Such a setting can be realized by, for example, setting the sensitivity of the secondary sorting system 20b to defective products to a lower level than the sensitivity of the primary sorting system 20a to defective products (i.e., adjusting the magnitude of the density threshold value and/or the size threshold value). According to such a setting, the yield can be further improved. However, the sorting accuracy of the secondary sorting system 20b may be set to a level equivalent to the sorting accuracy of the primary sorting system 20a.

Figure 3:
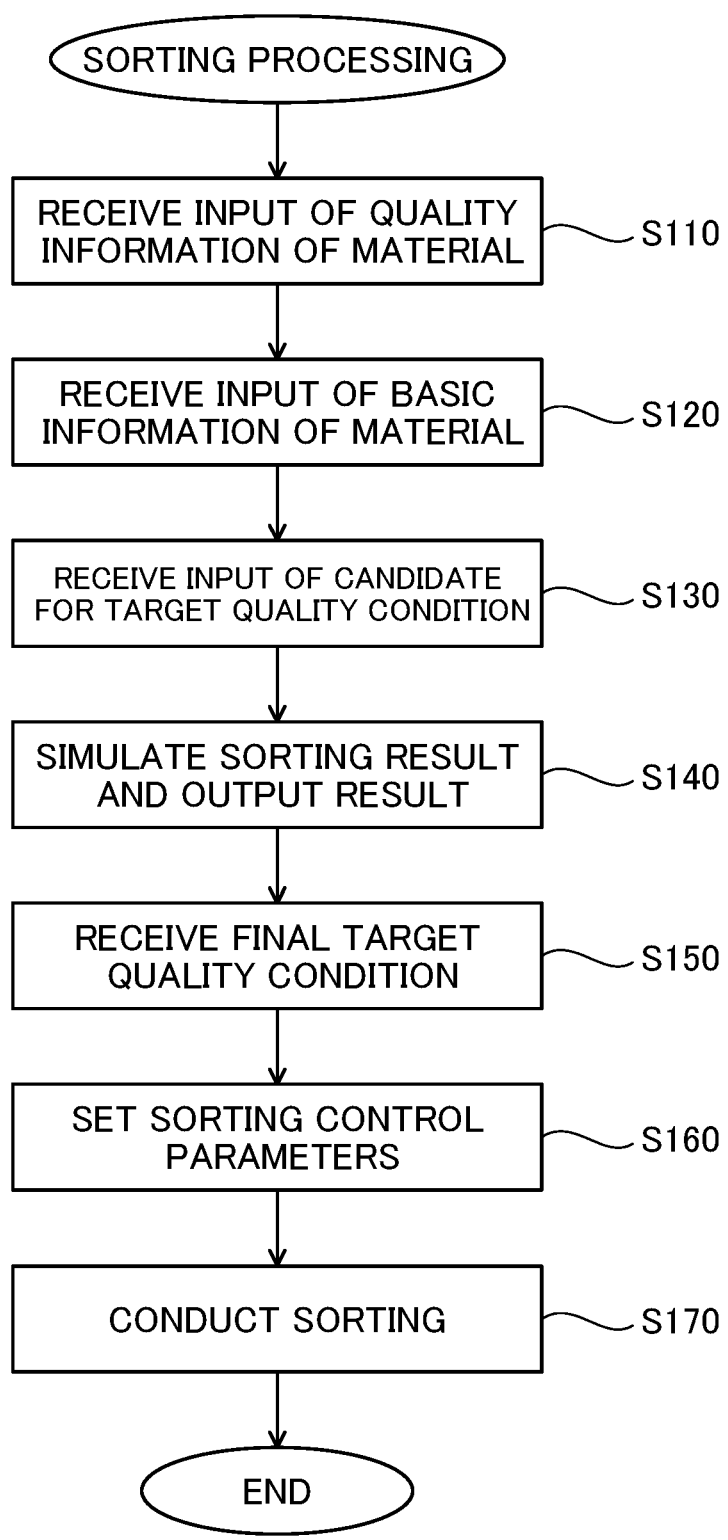
FIG. 3 is a flowchart illustrating a flow of sorting processing according to one embodiment.

The above-described sorter 20 has a function of sorting the sorting targets 90 in such a manner that the quality (more specifically, the mix rate for each type of defective product) of the sorting targets 90 collected as acceptable products matches a quality required by the user. The details of such a function will be described in the following description. FIG. 3 is a flowchart illustrating one example of a flow of the sorting processing performed by the sorter 20. In this processing, the controller 25 first receives an input of the quality information of the material, i.e., the sorting targets 90 introduced into the primary sorting system 20a (step S110). In the present embodiment, this quality information is input from the measurement apparatus 12 to the controller 25. In other words, the controller 25 receives an input of the mix rate of defective products regarding the samples measured by the measurement apparatus 12. In the present embodiment, the controller 25 receives an input of the mix rate (the ratio by weight) for each of a damaged grain, dead rice, a colored grain, a different kind of grain (more specifically, unhulled rice, wheat, and another different kind of grain), and a foreign object.

In an alternative embodiment, the quality information may be input by the user via a user interface. In this case, the user may measure the quality of samples using a grain analyzer and input a result of this measurement. Alternatively, the user may visually confirm the quality of samples and input a result of this confirmation. Further, in a case where the mix rate input from the measurement apparatus 12 to the controller 25 is provided in the form of a ratio of the number of grains, the controller 25 may calculate the ratio by weight using a specific gravity set for each type of defective product.

Next, the controller 25 receives an input of basic information about the material input by the user via a user interface (not illustrated) of the sorter 20 (step S120). This basic information includes the introduced quantity, the variety, the property (for example, the water content), and/or the like.

Next, the controller 25 receives a candidate for a target quality condition input by the user (step S130). The target quality condition refers to a condition regarding an allowable mix quantity for defective products mixed in the sorting targets 90 discharged from the sorter 20 as acceptable products. In other words, the target quality condition refers to a quality condition desired by the user to the sorting targets 90 discharged from the sorter 20 as acceptable products. In the above-described Agricultural Products Inspection Standards, the first grade, the second grade, and the third grade are defined as quality grades. As this grade is higher (i.e., the value of the grade is smaller), the output product (the sorting targets 90) is more high-quality and is sold higher. Upper limit values on the respective mix rates of dead rice, colored grains, a different kind of grains, and foreign objects, and an upper limit value on the mix rate of the total number of damaged grains, dead rice, colored grains, a different kind of grains, and foreign objects (i.e., non-perfect grains) are defined for each of the quality grades.

Figure 5:
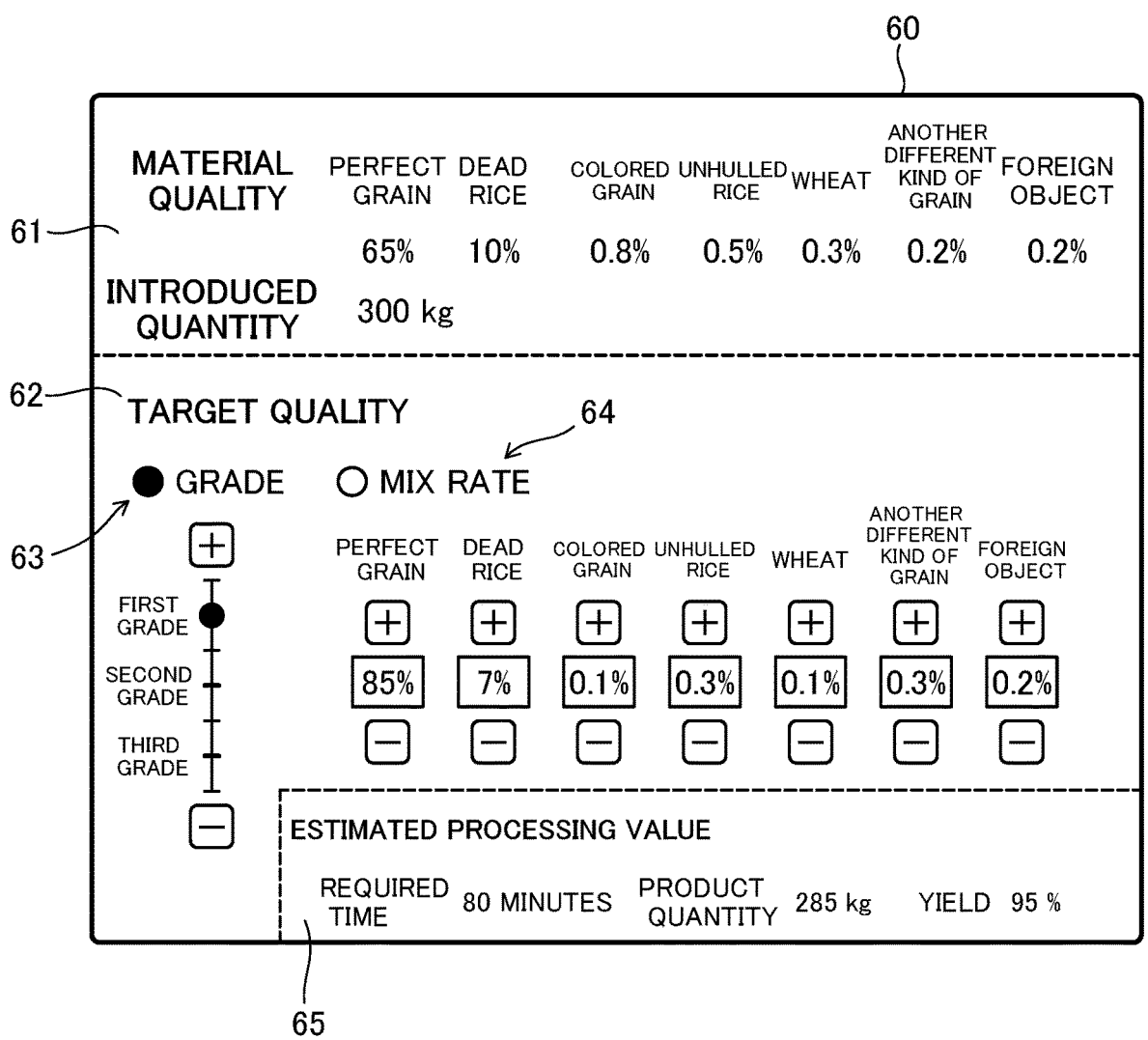
FIG. 5 illustrates one example of a user interface for receiving a target quality condition and outputting a simulation result.

FIG. 5 illustrates one example of a user interface for receiving the target quality condition. An illustrated user interface 60 is a touch panel-type graphical user interface. The quality information received by the controller 25 in step S110 is displayed in a material quality display region 61 of the user interface 60. In the present embodiment, the basic information received in step S120 is displayed in the material quality display region 61 in addition to the quality information. In the example illustrated in FIG. 5, the introduced quantity 300 kg received in step S120 is displayed in the material quality display region 61. The user can input the candidate for the target quality condition via a target quality input region 62 in step S130. The target quality input region 62 includes a selectable grade input region 63 and mix rate input region 64.

In the grade input region 63, the user can input a grade number in compliance with the Agricultural Products Inspection Standards. More specifically, the user can select the first grade, the second grade, the third grade, or intermediate grades between them as the candidate for the target quality condition according to the number of times of pressing a "+" button or a "−" button. FIG. 5 illustrates a state that the grade input region 63 is selected, and, further, the first grade is selected.

When the mix rate input region 64 is selected from the grade input region 63 and the mix rate input region 64, the user can input any upper limit value on the mix rate for each type of defective product as the candidate for the target quality condition in the mix rate input region 64. More specifically, the user can increase or reduce the numerical value indicating the upper limit value on the mix rate by pressing a "+" button or a "−" button. The currently set upper limit value on the mix rate is displayed between the "+" button and the "−" button.

In the present embodiment, the grade input region 63 and the mix rate input region 64 are configured to be operable in a linked manner. More specifically, when one of the grades is selected in the grade input region 63, the upper limit value on the mix rate for each type of defective product corresponding to this selected grade is displayed in the mix rate input region 64. In FIG. 5, the upper limit value on the mix rate for each type of defective product corresponding to the first grade selected in the grade input region 63 is displayed in the mix rate input region 64. On the other hand, when any number is input as the upper limit value on the mix rate for each type of defective product in the mix rate input region 64, the grade corresponding to this input content is displayed in the grade input region 63. For example, when the input content includes the upper limit value on the mix rate corresponding to the first grade and the upper limit value on the mix rate corresponding to the second grade depending on the type of defective product, such a selection corresponds to the second grade as a whole of the acceptable product and therefore the same display as when the second grade is selected is presented in the grade input region 63.

Next, the controller 25 simulates a sorting result regarding the quantity and the yield of the sorting targets 90 discharged from the sorter 20 as acceptable products that is expected to be acquired when the sorting targets 90 are sorted by the sorter 20 so as to achieve the candidate for the target quality condition received in step S130, and outputs the result of the simulation (step S140).

More specifically, the controller 25 first sets a control target value for each type of defective product based on the candidate for the target quality condition. This control target value is set to a value equal to or lower than the upper limit value on the mix rate corresponding to the candidate for the target quality condition. For example, when the first grade is selected, the upper limit value on the mix rate of dead rice corresponding to the first grade is 7%. Accordingly, the control target value is set to a value equal to or lower than 7%. In the present embodiment, the control target value is set to a value equal to the upper limit value on the mix rate corresponding to the candidate for the target quality condition. In an alternative embodiment, the control target value is set to a value acquired by multiplying the upper limit value on the mix rate corresponding to the candidate for the target quality condition by a safety factor. The safety factor is a coefficient for adding an allowance for reliably achieving the candidate for the target quality condition, and is a positive number smaller than 1. The safety factor may be, for example, an arbitrary number equal to or greater than 0.7 and smaller than 1. A reduction in the yield can be suppressed by refraining from setting the safety factor to an excessively small value.

Next, the controller 25 calculates the quantity and the yield of the sorting targets 90 discharged from the sorter 20 as acceptable products that are expected to be acquired when the sorting targets 90 are sorted in such a manner that the sorting result exactly achieves the control target value for each type of defective product (i.e., the sorting result matches the control target value). For example, supposing that the quality information indicates that the percentage of dead rice is 10% and the control target value of dead rice is 7%, the controller 25 calculates the quantity and the yield of the sorting targets 90 discharged from the sorter 20 as acceptable products that are expected to be acquired when only a part of all dead rice grains introduced into the sorter 20 are sorted out (removed) in such a manner that the dead rice accounts for 7% of the sorting targets 90 discharged from the sorter 20 as acceptable products. In other words, the calculation is made assuming that the sorting targets 90 are not excessively sorted out beyond the control target value. For a type of defective product that allows the control target value to be achieved even if they are not sorted out at all, the calculation is made assuming that the sorting (removal) is entirely omitted.

Next, the controller 25 outputs the result of the calculation, i.e., the result of the simulation to the user interface 60. In FIG. 5, the quantity of the sorting targets 90 discharged from the sorter 20 as acceptable products is displayed as a "product quantity" and the yield thereof is also displayed in an estimated value display region 65, which is provided to display the result of the simulation. The product quantity is calculated based on the introduced quantity received in step S120.

The result of the simulation is displayed in this manner in step S140, and therefore the user can confirm what kind of sorting result (i.e., the product quantity and the yield) can be acquired if the sorting targets 90 are sorted under the candidate for the target quality condition input in step S130 before the sorting processing is started. If the product quantity and the yield displayed in step S140 fall out of the range desired by the user, the user may input another candidate for the target quality condition again. This case means that the controller 25 performs steps S130 and 140 again, and displays a product quantity and a yield that are expected to be acquired when the sorting targets 90 are sorted under the other candidate for the target quality condition. Such an operation allows the user to confirm a plurality of combinations of the target quality condition, and the product quantity and yield, and select a target quality condition corresponding to a desired combination of the target quality condition and the product quantity and the yield from these combinations as a final target quality condition to be employed when the sorting targets 90 are sorted by the sorter 20.

In an alternative embodiment, the controller 25 may simulate the sorting result with respect to each of a plurality of candidates for the target quality condition and display the respective simulation results regarding this plurality of candidates simultaneously. In this case, the plurality of candidates may be predefined (for example, may be defined as the first grade, the second grade, and the third grade) or the sorter 20 may include a user interface that allows the user to input the plurality of candidates on a single screen. In a further alternative embodiment, the displayed content may include only any one of the product quantity and the yield.

Next, the controller 25 receives an input of the final target quality condition input by the user (step S150). Next, the controller 25 sets sorting control parameters that allow the sorter 20 to achieve the final target quality condition (step S160).

These sorting target parameters include a setting value regarding a percentage (hereinafter referred to as a sorting rate) of the sorting targets 90 targeted to be sorted out (i.e., targeted to be removed by the air ejection) among the sorting targets 90 determined to be defective products (this setting value hereinafter referred to as a sorting rate setting value).

This sorting rate setting value is set for each type of defective product according to the quality information and the control target value corresponding to the final target quality condition. More specifically, the sorting rate that allows the sorting result to exactly achieve the control target value corresponding to the final target quality condition (i.e., the sorting rate when the sorting result matches the control target value) is determined by a calculation based on the quality information and this control target value. For example, supposing that the mix rate of dead rice based on the quality information is 10%, the control target value regarding dead rice is 7%, the introduced quantity is 300 kg, and the product quantity based on the simulation is 285 kg, the mix quantity of dead rice in the introduced quantity is calculated to be 300 kg×10%=30 kg, and the allowable mix quantity of dead rice in the output product is calculated to be 285 kg×7%=19.95 kg. Accordingly, the quantity of dead rice targeted to be removed is calculated to be 30 kg−19.95 kg=10.05 kg, and the sorting rate that allows the sorting result to exactly achieve the control target value is calculated to be 10.05 kg÷30 kg=33.5%. For the primary sorting system 20a, the sorting rate setting value is set to a value equal to the sorting rate that allows the sorting result to exactly achieve the control target value or a value acquired by multiplying this sorting rate by a safety factor (a value greater than 1). In the present embodiment, the sorting rate setting value of the secondary sorting system 20b is set in such a manner that the mix rate for each type of defective product in the sorting targets 90 discharged from the secondary sorting system 20b as acceptable products matches the material quality (i.e., the mix rate based on the quality information received in step S110).

Further, the sorting control parameters include a threshold value for determining a defective product, i.e., the above-described threshold value predetermined for each type of defective product (the density threshold value, or the density threshold value and the size threshold value). The threshold value for determining a defective product defines the sensitivity to a defective product. In the present embodiment, the threshold value for determining a defective product is set to an initial value regardless of the contents of the quality information and the control target value corresponding to the final target quality condition. The initial value is predetermined based on, for example, an experiment.

Further, the sorting control parameters include a setting regarding the ejection range of the air 53 for removing a defective product. The air ejection range here refers to a range in a coordinate system that moves together with the sorting target 90 during the conveyance. The setting regarding the ejection range can include a setting of an ejection period of the air 53 (i.e., a duration for which the ejection continues). An increase in the ejection period leads to an increase in the range where the air 53 is ejected to the sorting target 90 in the conveyance direction D1 and therefore contributes to further reliably removing a defective product, but increases the probability of occurrence of the collateral unintentional removal at the same time.

Further, the setting regarding the ejection range can include a setting regarding the assignment of the ejection responsibility range with respect to the position at which the sorting target 90 is detected in the direction in which the plurality of nozzles 51 is arranged (the perpendicular direction D2). Hereinafter, assuming that, when the center of a defective portion in a defective product is located at a predetermined detection position, the air 53 is ejected from the nozzle 51 whose ejection responsibility range contains this detection position, the setting of the assignment of the ejection responsibility range will be specifically described.

Figure 6:
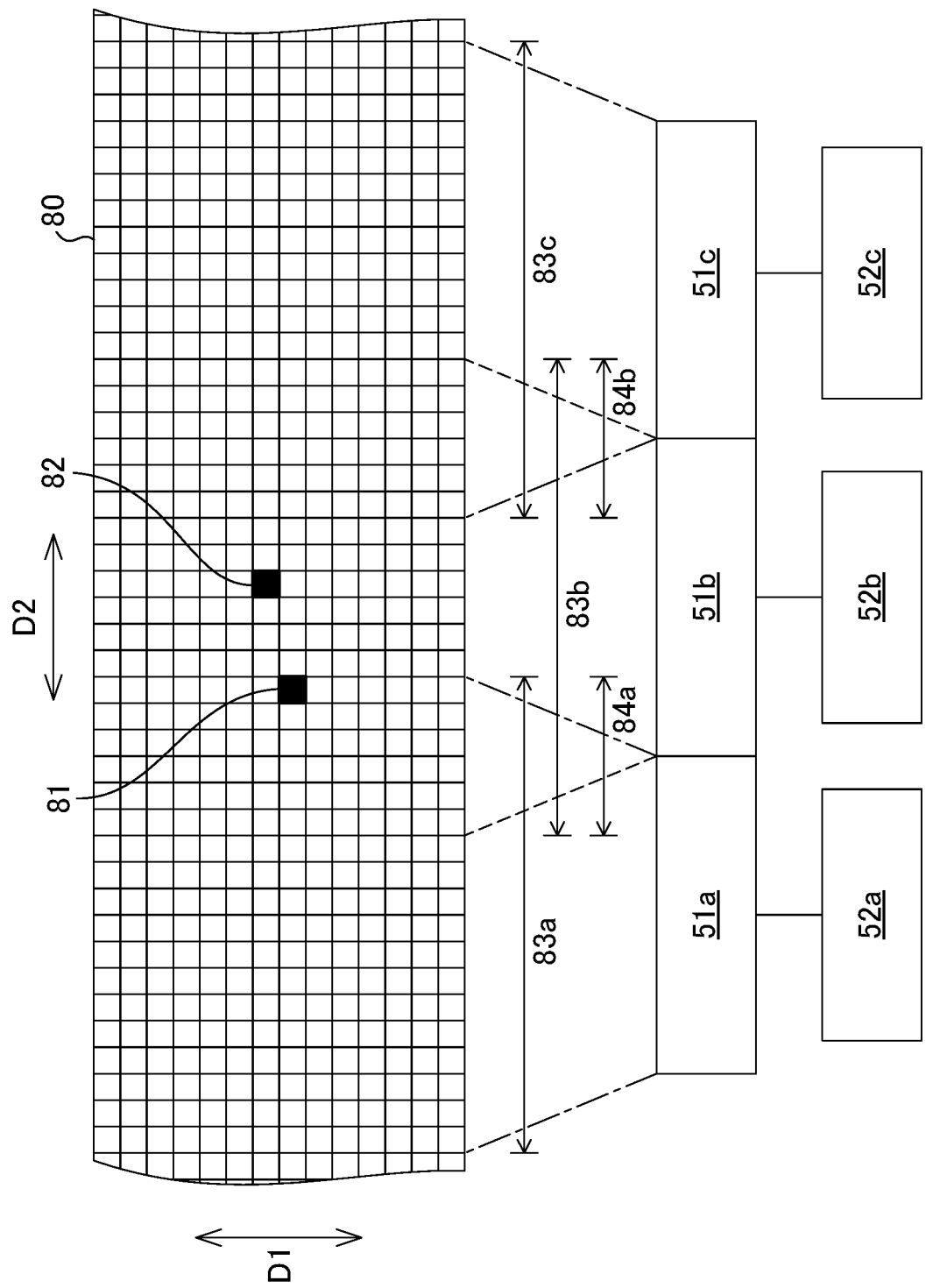
FIG. 6 is a schematic diagram illustrating one example of a setting of an ejection responsibility range of each nozzle.

FIG. 6 is a schematic diagram illustrating one example of the setting of the assignment of the ejection responsibility range. FIG. 6 illustrates only three nozzles 51 on the way of the array of the large number of nozzles 51 arranged in the perpendicular direction D2 as nozzles 51a to 51c for convenience of the description. Valves 52a to 52c are connected to the nozzles 51a to 51c, respectively. In FIG. 6, each cell represents each of pixels forming an image 80 input to the controller 25. As illustrated in FIG. 6, ejection responsibility ranges 83a to 83c are associated with the nozzles 51a to 51c, respectively. In FIG. 6, the corresponding relationships between the nozzles 51a and 51c and the ejection responsibility ranges 83a and 83c associated with them are indicated by long dashed short dashed lines, and the corresponding relationship between the nozzle 51b and the ejection responsibility range 83b associated with it is indicated by a dotted line. As illustrated in FIG. 6, the two ejection responsibility ranges 83a and 83b corresponding to the adjacent two nozzles 51a and 51b overlap each other in an overlap region 84a. Similarly, the two ejection responsibility ranges 83b and 83c corresponding to the adjacent two nozzles 51b and 51c overlap each other in an overlap region 84b.

When the center of the defective portion is located at a pixel 82, the pixel 82 belongs to only the ejection responsibility range 83b and therefore the air 53 is ejected only from the nozzle 51b corresponding to the ejection responsibility range 83b. On the other hand, when the center of the defective portion is located at a pixel 81, the pixel 81 belongs to the overlap region 84a (i.e., belongs to both the ejection responsibility ranges 83a and 83b), and therefore the air 53 is ejected from the two nozzles 51a and 51b corresponding to the ejection responsibility ranges 83a and 83b. In this manner, whether the air 53 is ejected from one nozzle 51 among the plurality of nozzles 51 or the air 53 is ejected from this one nozzle 51 and a nozzle 51 adjacent to this one nozzle 51 is determined according to how the ejection responsibility range is assigned. The overlap region can be variably set using any number of pixels equal to or greater than zero. Ejecting the air 53 from two adjacent nozzles 51 leads to an increase in the range where the air 53 is ejected to the sorting target 90 in the perpendicular direction D2 and thus contributes to further reliably removing the defective product, but raises the probability of occurrence of the collateral unintentional removal at the same time.

In the present embodiment, the setting regarding the ejection range is set to an initial value regardless of the contents of the quality information and the control target value corresponding to the final target quality condition. The initial value is predetermined based on, for example, an experiment.

Further, the sorting control parameters include settings regarding the discharge destinations of the sorting target 90 discharged from the secondary sorting system 20b as an acceptable product and the sorting target 90 discharged from the secondary sorting system 20b as a defective product (i.e., settings of the switching valves 23 and 24). In the present embodiment, these settings regarding the discharge destinations are set to initial states (the reintroduction of the sorting target 90 discharged as an acceptable product to the primary sorting system 20a and the discharge of the sorting target 90 discharged as a defective product to the defective product container 22) regardless of the contents of the quality information and the control target value corresponding to the final target quality condition. The switching valves 23 and 24 can be omitted, and the setting regarding the discharge destination is constituted by the setting regarding the discharge destination of the sorting target 90 discharged as a defective product if the switching valve 23 is omitted alone, and constituted by the setting regarding the discharge destination of the sorting target 90 discharged as an acceptable product if the switching valve 24 is omitted alone.

Further, the sorting control parameters include a flow rate (a fed quantity from the feeder 72 to the chute 73). In the present embodiment, the setting regarding this flow rate is set to an initial value regardless of the contents of the quality information and the control target value corresponding to the final target quality condition. The initial value is predetermined based on, for example, an experiment. An increase in the flow rate contributes to an increase in the processing capability of the sorter 20, but, at the same time, leads to a reduction in a space between the sorting targets 90 falling from the chute 73, thereby raising the probability of occurrence of the collateral unintended removal.

As clearly seen from the above description, in the present embodiment, the adjustment for achieving the final target quality condition is made only based on the adjustment of the sorting rate setting value when the sorting control parameters are set so as to achieve the final target quality condition. However, at least one of the above-described other sorting control parameters may be adjusted in addition to the sorting rate setting value. More specifically, at least one of the threshold value (the density threshold value, or the density threshold value and the size threshold value), the ejection period and/or the size of the overlap region, the discharge destination(s), and the flow rate may be changed according to the quality information and the control target value corresponding to the final target quality condition. Further, the controller 25 may change the initial value or the initial state regarding at least a part of the above-described sorting control parameters other than the sorting rate setting value according to the variety and/or the property received in step S120.

After setting the sorting control parameters in this manner, the controller 25 conducts the sorting by the primary sorting system 20a and the secondary sorting system 20b based on the sorting control parameters set in step S160 (step S170).

In step S170, the sorting targets 90 are sorted based on the sorting rate setting values set in step S160. For example, supposing that the sorting rate setting value of dead rice is set to 50% and the sorting rate setting value of colored grains is set to 25%, the air 53 is ejected only to the sorting targets 90 accounting for 50% among sorting targets 90 determined to be dead rice, and the air 53 is ejected only to sorting targets 90 accounting for 25% among the sorting targets 90 determined to be colored grains.

In the present embodiment, such a selective removal of defective products is carried out in the following manner. First, the controller 25 counts defective products in an image acquired in a predetermined period. Then, the controller 25 ejects the air 53 only to defective products numbered in correspondence with the sorting rate setting value. For example, if the sorting rate setting value of dead rice is 50%, the air 53 is ejected only to even-numbered dead rice. On the other hand, if the sorting rate setting value of colored grains is 25%, the air 53 is ejected only to colored grains numbered with a multiple of 4. In such control, the defective products may be counted assuming that the number of determined defective portions is equal to the number of defective products.

In an alternative embodiment, the defective products may be selectively removed in priority order according to the density of the defective portion. More specifically, higher priority may be placed on a removal of a defective product having a higher-density defective portion (a defective portion having a tone value relatively largely different from the density threshold value). This configuration can be realized by, for example, ranking the defective products in the image acquired in the predetermined period according to the density of the defective portion, and ejecting the air 53 only to defective products having defective portions ranked at or higher than a rank corresponding to the sorting rate setting value. According to this configuration, the product quality can be improved by placing higher priority on a removal of a defective product having a more serious defect (more specifically, a defect having a higher density). For example, if the type of defective product is a colored grain, a colored grain colored at a relatively high density can be prioritized to be removed. On the other hand, if the type of defective product is dead rice, dead rice whitened at a relatively high density can be prioritized to be removed.

In a further alternative embodiment, the defective products may be selectively removed in priority order according to the size of the defective portion. For example, for defective products other than broken grains, higher priority may be placed on a removal of a defective product having a larger defective portion (for example, a defective portion large in area or a defective portion long in length). According to this configuration, the product quality can be improved by placing higher priority on a removal of a defective product having a more serious defect (more specifically, this defective portion is larger). For example, if the defective products include an entirely colored grain and a partially colored grain, the entirely colored grain can be prioritized to be removed over the partially colored grain. Alternatively, for broken grains, higher priority may be placed on a removal of a larger grain. Because the target quality condition is set in the form of a ratio by weight, prioritizing a removal of a large grain (i.e., a relatively heavy grain) is more effective to increase the weight of a defective product removable by ejecting the air once. Therefore, the target quality condition can be efficiently achieved with a further smaller number of times of air ejection. The reduction in the number of times of air ejection also leads to a reduction in the number of times that the collateral unintentional removal occurs, and therefore the yield can be improved according to this configuration.

In a further alternative embodiment, priority order may be set regarding a determination about whether to remove a defective product (hereinafter referred to as a removal determination) among the types of defective products. More specifically, the removal determination may be prioritized for a type of defective product corresponding to a strict control target value (the target mix rate is low). In this case, for example, supposing that there is a defective product having a first type of defect and a second type of defect whose priority order of the removal determination is lower than the first type of defect, when the removal thereof is determined to be unnecessary in terms of the first type of defect, the removal determination is not made in terms of the second type of defect and this defective product is handled as an acceptable product. According to such a configuration, the defective products can be prevented from being removed excessively for the control target value in the case where there is a defective product having a plurality of types of defects at the same time. In a further alternative embodiment, the removal determination may be prioritized for a defective product with a large difference lying between the quality information and the control target value.

In the present embodiment, the controller 25 is configured to perform parameter change processing to execute feedback control so as to allow actual sorting processing to output a result (i.e., the mix rate for each type of defective product) closer to the final target quality condition in step S170. The parameter change processing refers to processing for changing the sorting control parameters according to a processing state during the sorting operation. Now, the parameter change processing will be described.

Figure 4:
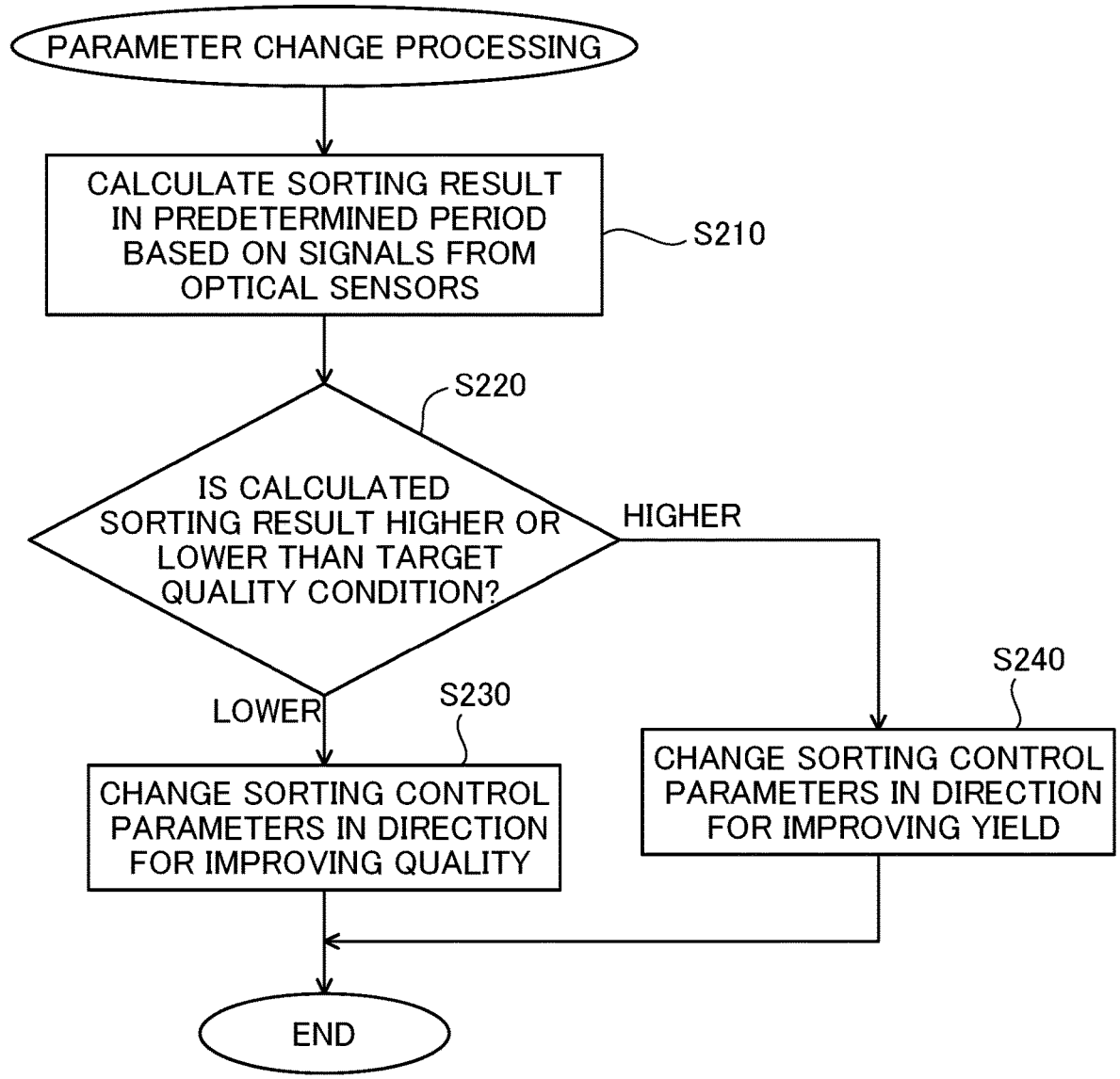
FIG. 4 is a flowchart illustrating a flow of parameter change processing according to one embodiment.

FIG. 4 is a flowchart illustrating a flow of the parameter change processing. This processing is repeatedly performed regularly (for example, every several seconds or every several minutes) during the sorting operation of the sorter 20. When the parameter change processing is started, the controller 25 first calculates the sorting result regarding the target quality condition in the predetermined period based on the signals (more specifically, the image) acquired by the optical sensors 41 and 42 (step S210). In other words, the controller 25 detects the mix state for each type of defective product from the image of the sorting targets 90 actually in process, and calculates the mix rate (i.e., the sorting result) for each type of defective product in the sorting targets 90 discharged from the sorter 20 as acceptable products based on a result of this detection.

More specifically, the total quantity of the sorting targets 90 introduced into the primary sorting system 20a and the quantity for each type of defective product therein can be detected based on the image acquired by the optical sensors 41 and 42 of the primary sorting system 20a. Further, the total quantity of the sorting targets 90 introduced into the secondary sorting system 20b and the quantity for each type of defective product therein can be detected based on the image acquired by the optical sensors 41 and 42 of the secondary sorting system 20b. The sorting targets 90 discharged from the primary sorting system 20a as defective products are introduced into the secondary sorting system 20b, and therefore the total quantity of the sorting targets 90 discharged from the primary sorting system 20a as acceptable products (an output product) and the quantity for each type of defective product therein can be calculated based on respective differences between the total quantity of the sorting targets 90 introduced into the primary sorting system 20a and the quantity for each type of defective product therein, and the total quantity of the sorting targets 90 introduced into the secondary sorting system 20b and the quantity for each type of defective product therein.

FIG. 7 is a table illustrating one example of the calculation method in step S170. In this example, the reintroduction of the sorting targets 90 discharged from the secondary sorting system 20b as acceptable products into the primary sorting system 20a is not taken into consideration for simplification. A quantity (A kg) introduced into the primary sorting system 20a can be calculated, for example, in the following manner. First, the number of grains or the number of pixels indicating the sorting targets 90 is counted using the image acquired by the optical sensors 41 and 42 of the primary sorting system 20a. Then, the introduced quantity "A (kg)" is calculated by multiplying the acquired number of grains or pixels by an assumed value of the weight per grain or an assumed value of the weight per pixel. The specific gravity of a grain may be different between a perfect grain and a defective product or among types of defective products. Therefore, in an alternative embodiment, the weight may be calculated for each of a perfect grain and types of defective products by counting the number of grains or pixels indicating the sorting targets 90 for each of a perfect grain and types of defective products and multiplying the acquired number of grains or pixels by the assumed value of the weight per grain or pixel set for each of a perfect grain and types of defective products. In this case, the introduced quantity "A (kg)" is calculated by adding up the weight calculated for each of a perfect grain and types of defective products. A quantity "I (kg)" introduced into the secondary sorting system 20b can also be calculated by a similar method using the image acquired by the optical sensors 41 and 42 of the secondary sorting system 20b.

Further, a ratio by weight "B (%)" accounted for by perfect grains in the sorting targets 90 introduced into the primary sorting system 20a can be calculated, for example, in the following manner. First, the number of grains or the number of pixels indicating perfect grains is counted using the image acquired by the optical sensors 41 and 42 of the primary sorting system 20a. Then, the weight of perfect grains is calculated by multiplying the acquired number of grains or pixels by an assumed value of the weight per perfect grain or an assumed value of the weight per pixel indicating the perfect grain. Then, the ratio by weight "B (%)" of perfect grains is calculated by dividing the weight of perfect grains by the introduced quantity "A (kg)". Each of ratios by weight C to H of the various types of defective products can also be calculated by a similar method. More specifically, for example, first hypothetically assuming that the number of defective portions is equal to the number of defective products, the number of grains indicating a specific type of defective products is counted. Then, each of the ratios by weight C to H of the various types of defective products is calculated by multiplying the acquired number of grains or pixels by an assumed value of the weight per grain of the corresponding type of defective product. Alternatively, hypothetically assuming that the number of defective portions is equal to the number of defective products, each of the ratios by weight C to H of the various types of defective products is calculated by multiplying the number of a specific type of defective portions by an assumed value of the number of pixels per grain of the corresponding type of defective product and further multiplying a resultant value by an assumed value of the weight per pixel of the corresponding specific type of defective product. Further, each of ratios by weight J to P accounted for by perfect grains and the various types of defective products in the sorting targets 90 introduced into the secondary sorting target 20b can also be calculated by a method to similar the primary sorting system 20a using the image acquired by the optical sensors 41 and 42 of the secondary sorting system 20b.

A ratio by weight T accounted for by perfect grains in the sorting targets 90 discharged from the primary sorting system 20a as acceptable products (i.e., the output product) can be calculated by dividing, by the product quantity (S kg), a value acquired by subtracting a value acquired by multiplying the quantity of the sorting targets 90 introduced into the secondary sorting system 20b (I kg) by the percentage of perfect grains therein (J %) from a value acquired by multiplying the quantity of the sorting targets 90 introduced into the primary sorting system 20a (A kg) by the percentage of perfect grains therein (B %). Percentages U to Z accounted for by the various types of defective products in the output product (i.e., the mix rates) can also be calculated by a similar method as illustrated in FIG. 7.

Now, the present embodiment will be further described, referring back to FIG. 4. The period for acquiring the image based on which the calculation is made in step S210 (the above-described predetermined period) may be, for example, a period since the last time that the parameter change processing is performed until now. Alternatively, this period may be a period since the sorting operation of the sorter 20 is started until now. Further, the image based on which the calculation is made in step S210 may be acquired at the same timing between the image acquired by the optical sensors 41 and 42 of the primary sorting system 20a (hereinafter referred to as a primary sorting image) and the image acquired by the optical sensors 41 and 42 of the secondary sorting system 20b (hereinafter referred to as a secondary sorting image). Acquiring the image in this manner allows the sorting result to be easily calculated. Alternatively, the secondary sorting image may be acquired at a timing delayed behind the primary sorting image. This delayed time corresponds to an assumed time taken until the sorting target 90 imaged in the primary sorting system 20a is discharged as a defective product and introduced into the secondary sorting system 20b and imaged therein. Adjusting the timing in this manner facilitates a further correct calculation of the sorting result.

After calculating the sorting result in the above-described manner, the controller 25 next determines whether the calculated sorting result is higher or lower than the final target quality condition (step S220). This determination is made for each type of defective product.

If the calculated sorting result is lower than the final target quality condition as a result of the determination (step S220: LOWER), the controller 25 changes the sorting target parameters in a direction for improving the product quality (i.e., for allowing the calculated sorting result to indicate a quality to closer the final target quality condition) (step S230). More specifically, in the present embodiment, the controller 25 changes the sorting rate setting value regarding the type of defective products determined to be lower in quality than the target quality condition to a higher value than the present setting value. The new sorting rate setting value is calculated so as to achieve the final target quality condition according to the difference between the calculated sorting result (U to Z in FIG. 7) and the target quality condition. According to this configuration, the air 53 is more frequently ejected to the sorting target 90 determined to be a defective product (i.e., the number of defective products intentionally excluded from the removal reduces), and therefore the output product can have a quality to closer the final target quality condition.

In an alternative embodiment, the controller 25 changes the density threshold value regarding the type of defective products determined to be lower in quality than the target quality condition to a lower value than the present setting. In other words, the density threshold value is changed so as to increase the sensitivity to the defective products. In a further alternative embodiment, if the sorting result regarding the total mix rate of damaged grains (including broken grains), dead rice, colored grains, a different type of grains, and foreign objects is determined to be lower in quality than the target quality condition, the controller 25 changes the size threshold value regarding broken grains to a larger value than the present setting. In a further alternative embodiment, if an arbitrary type of defective products other than broken grains is determined to be lower in quality than the target final condition, the controller 25 changes the size threshold value regarding the corresponding type of defective products to a smaller value than the present setting. Changing the density threshold value or the size threshold value in this manner leads to an increase in the number of sorting targets 90 determined to be defective products, thereby causing the air 53 to be more frequently ejected to the sorting targets 90 determined to be defective products, thus allowing the output product to have a quality to closer the final target quality condition.

In a further alternative embodiment, the controller 25 changes the setting of the ejection range regarding the type of defective products determined to be lower in quality than the target quality condition so as to increase the ejection range. More specifically, the controller 25 may change the ejection period to a longer value than the present setting. Alternatively, the controller 25 may change the setting of the assignment of the ejection responsibility range so as to increase the overlap region (i.e., make it more likely for the air 53 to be ejected from two nozzles 51) instead of or in addition to the change in the ejection period. Changing the ejection range in this manner allows the defective product to be further reliably removed when the air 53 is ejected, thereby allowing the output product to have a quality to closer the final target quality condition.

In a further alternative embodiment, if the calculated sorting result is lower than the final target quality condition with respect to all or a part of types of defective products, the controller 25 changes the flow rate to a lower value than the present setting. This change leads to an increase in the space between the sorting targets 90 falling from the chute 73, thereby facilitating further correct detection of defective products. Therefore, the output product can have a quality to closer the final target quality condition. In addition, the space increases between the sorting targets 90 falling from the chute 73, which can reduce the occurrence of the collateral unintentional removal, thereby also contributing to improving the yield.

In a further alternative embodiment, two or more of the above-described changes in the various kinds of sorting parameters may be combined in any manner. This can further ensure that the output product has a quality to closer the final target quality condition. According to step S230, even when the quality information received in step S110 and the actual mix rate of defective products are different, the final target quality condition can be reliably achieved.

On the other hand, if the calculated sorting result is higher than the final target quality condition (step S220: HIGHER), the controller 25 changes the sorting target parameters in a direction for improving the product yield. This intends to improve the yield while reducing the product quality to such a degree that the final target quality condition can still be achieved. More specifically, in the present embodiment, the controller 25 changes the sorting rate setting value regarding the type of defective product determined to be higher in quality than the target quality condition to a lower value than the present setting value. The new sorting rate setting value is calculated in such a manner that the product quality after the change does not fall below the final target quality condition according to the difference between the calculated sorting result and the target quality condition. According to this configuration, the product yield can be improved while the final target quality condition can be achieved.

In an alternative embodiment, the controller 25 changes the density threshold value regarding the type of defective product determined to be higher in quality than the target quality condition to a higher value than the present setting. This leads to a reduction in the sensitivity to the defective products (i.e., a reduction in the number of sorting targets 90 determined to be defective products), thereby also resulting in a reduction in the number of removed defective products and contributing to improving the yield. In a further alternative embodiment, if the sorting result regarding the total mix rate of damaged grains (including broken grains), dead rice, colored grains, a different type of grains, and foreign objects is determined to be higher in quality than the target quality condition, the controller 25 changes the size threshold value regarding broken grains to a smaller value than the present setting. This can also improve the yield. In addition, a relatively large-size (i.e., a relatively heavy-weight) broken grain is excluded from the removal targets and a relatively small-size (i.e., relatively light-weight) broken grain remains in the removal targets, and therefore the yield calculated based on the weight can be efficiently improved. In a further alternative embodiment, if an arbitrary type of defective product other than the broken grain is determined to be higher in quality than the target final condition, the controller 25 changes the size threshold value regarding the corresponding type of defective product to a larger value than the present setting. This also leads to a reduction in the sensitivity to the defective product, thereby contributing to improving the yield.

In a further alternative embodiment, the controller 25 changes the setting of the ejection range regarding the type of defective product determined to be higher in quality than the target quality condition so as to reduce the ejection range. More specifically, the controller 25 may change the ejection period to a shorter value than the present setting. Alternatively, the controller 25 may change the setting of the assignment of the ejection responsibility range so as to reduce the overlap region (i.e., make it less likely for the air 53 to be ejected from two nozzles 51) instead of or in addition to the change in the ejection period. Changing the ejection range in this manner can reduce the occurrence of the collateral unintended removal, thereby improving the yield.

In a further alternative embodiment, if the calculated sorting result is higher than the final target quality condition with respect to all types of defective products, the controller 25 changes the setting regarding the discharge destination of the sorting target 90 discharged from the secondary sorting system 20b as an acceptable product or a defective product. More specifically, the switching of the switching valve 23 may be controlled so as to switch the discharge destination of the sorting target 90 discharged from the secondary sorting system 20b as an acceptable product from the reintroduction to the primary sorting system 20a to the acceptable product 21 hopper. Instead thereof or in addition thereto, the switching of the switching valve 24 may be controlled so as to switch the discharge destination of the sorting target 90 discharged from the secondary sorting system 20b as a defective product from the defective product container 22 to the acceptable product 21 hopper.

Whether to switch the discharge destination from the initial state and whether to control the switching of one or both of the switching valves 23 and 24 may be determined according to the difference between the calculated sorting result and the final target quality condition. More specifically, these determinations are made based on whether the final target quality condition can be achieved. The switching valves 23 and 24 are controlled so as to guide as many sorting targets 90 as possible to the acceptable product 21 hopper within the range capable of achieving the final target quality condition. Such a determination can be made based on the calculated sorting result (for example, J to Z in FIG. 7). For this determination, the mix rates of the various types of defective products discharged from the secondary sorting system 20b as acceptable products may be estimated based on the ratios by weight J to P and the sorting control parameters of the secondary sorting system 20b.

In a further alternative embodiment, two or more of the above-described changes in the various kinds of sorting parameters may be combined in any manner. This can further improve the yield. According to step S240, the yield can be improved while the final target quality condition can be achieved.

In this manner, after step S230 or step S240 is performed, the parameter change processing is ended. If the calculated sorting result is equivalent to the final target quality condition in step S220, the parameter change processing is ended without proceeding to step S230 or S240, although this is not illustrated. In an alternative embodiment, the calculated sorting result and the control target value may be compared in step S220. Alternatively, the processing may proceed to step S230 when the controller 25 determines that the calculated sorting result falls below the final target quality condition or the control target value by a predetermined degree in step S220, or the processing may proceed to step S240 when the controller 25 determines that the calculated sorting result exceeds the final target quality condition or the control target value by a predetermined degree in step S220. Alternatively, a control hysteresis may be set in the determination in step S220. In other words, the determination criterion for the processing to proceed from step S220 to step S230 and the determination criterion for the processing to proceed from step S220 to step S240 may be different from each other.

According to the above-described sorter 20, the user can confirm the simulation result regarding the quantity and the yield of the sorting targets 90 discharged as acceptable products that is expected to be acquired when the candidate for the target quality condition is employed, before starting the sorting operation. Therefore, the user can determine the final target quality condition to be employed based on the simulation result (i.e., in consideration of the quantity and/or the yield of the sorting targets 90 discharged as acceptable products). Therefore, the user can acquire the sorting targets 90 satisfying a desired quality and yield as the output product.

Having described embodiments of the present disclosure, the above-described embodiments are intended to only facilitate the understanding of the present teachings, and are not intended to limit the present invention thereto. The present invention can be modified or improved without departing from the spirit thereof, and the present invention includes equivalents thereof. Further, each of the elements described in the claims and the specification can be combined in any manner or omitted in any manner within a range that allows it to remain capable of achieving at least a part of the above-described objects or bringing about at least a part of the above-described advantageous effects.

For example, the above-described flowcharts are merely examples, and each of the processing procedures constituting the flowcharts may be subjected to a change in the processing order therein and/or be changed to equivalent processing within a range that does not depart from the spirit of the present invention.

For example, the controller 25 may also display the result of simulating the quality condition on the user interface 60 in addition to the product quantity and/or the yield in step S140. Further, the input of the various kinds of information by the user and the display of the simulation result may be provided using another information processing apparatus communicably connected to the sorter 20 without being limited to being provided using the user interface of the sorter 20.

Further, in the case where the sorter 20 does not include the secondary sorting system 20*b*, the controller 25 may calculate the sorting result only based on the image acquired by the optical sensors 41 and 42 of the primary sorting system 20*a* in step S210. In this case, for example, the mix rates of the various types of defective products in the output product may be calculated based on the information A to H illustrated in FIG. 7 and the sorting rate setting values.

Further, steps S110 and S140 may be omitted. In this case, the controller 25 may set the sorting control parameters that allow the sorter 20 to achieve the target quality condition based on the target quality condition received in step S130 and the mix rate of defective products calculated based on the image acquired in the primary sorting system 20*a* or the primary sorting system 20*a* and the secondary sorting system 20*b* during the sorting operation instead of the parameter change processing illustrated in FIG. 4.

Alternatively, the controller 25 may calculate the mix state of defective products (i.e., the mix rate for each type of defective product) in the sorting targets 90 introduced into the primary sorting system 20*a* based on the image acquired in the primary sorting system 20*a* instead of the parameter change processing illustrated in FIG. 4. In this case, the controller 25 may change the sorting control parameters according to the difference between the quality information received in step S110 and the calculated mix rate for each type of defective product. More specifically, the controller 25 may perform the processing in step S230 if the quality information indicates a mix rate lower than the calculated mix rate by a predetermined degree, and perform the processing in step S240 if the quality information indicates a mix rate higher than the calculated mix rate by a predetermined degree. This control is performed for each type of defective product.

In this manner, the controller 25 may detect the mix state of defective products in the sorting targets 90 in the predetermined period based on the signals acquired by the optical sensors 41 and 42 of the primary sorting system 20*a* or the primary sorting system 20*a* and the secondary sorting system 20*b*, and change the sorting control parameters based on this mix state. According to such a configuration, appropriate sorting control parameters for achieving the target quality condition can be set based on the actual mix rate of defective products.

Further, if the mix rate of defective products is high in at least one of the primary sorting system 20*a* and the secondary sorting system 20*b*, defective products and perfect grains may be sorted by ejecting the air 53 toward the sorting targets 90 determined to be perfect grains (so-called reverse screening) instead of the sorting targets 90 determined to be defective products. In this case, the sorting rate can be controlled like the above-described embodiment by also ejecting the air 53 to a part of the sorting targets 90 determined to be defective products to intentionally mix a part of the defective products in the perfect grains.

Further, the sorting device 50 configured to eject the air 53 can be replaced with a sorting device configured in any manner. For example, the sorting device may include a plurality of members (for example, a louver) disposed adjacent to the conveyance route of the sorting target 90 and configured to be selectively displaced by an actuator. In this case, the sorting device can change the conveyance route of a defective product to sort out the defective product by displacing a member corresponding to the position at which the defective product is detected to cause it to hit the defective product. Alternatively, the sorting device may include a plurality of air suction devices disposed adjacent to the conveyance route of the sorting target 90 and configured to be selectively driven. In this case, the sorting device can change the conveyance route of a defective product to sort out the defective product by driving an air suction device corresponding to the position at which the defective product is detected to cause it to suck the defective product.

Further, the controller 25 may receive inputs of a plurality of candidates for the target quality condition in step S130. Alternatively, the controller 25 may read in a plurality of candidates for the target quality condition that is stored in the memory of the sorter 20 in advance to thus receive inputs thereof in step S130. In addition to these configurations, the output of the simulation result may be omitted in step S140, and step S150 may also be omitted. In this case, the controller 25 may determine the final target quality condition based on the result of the simulation in step S130. In this case, the controller 25 may determine to set a candidate for the target quality condition that maximizes the yield as the final target quality condition, or may calculate a predicted value of product sales by multiplying the quantity of the sorting targets discharged as acceptable products by a predetermined product unit price and determine to set a candidate for the target quality condition that maximizes the predicted value of product sales as the final target quality condition. Further, in this case, the controller 25 may automatically conduct the sorting after the final target quality condition is determined. Alternatively, the controller 25 may display the simulation result (i.e., the product quantity and/or the yield) and/or the predicted value of product sales on the user interface 60 and conduct the sorting after receiving an instruction to conduct the sorting from the user via the user interface 60. According to such a configuration, the load on the user operation is reduced and therefore the convenience is improved.

The present invention can be realized in various forms, such as a simulation apparatus, a simulation method, a sorting method, a simulation program, and a storage medium storing this program therein in a computer-readable manner besides the sorter exemplarily described above. In the case where the present invention is realized as a simulation apparatus, this simulation apparatus may be mounted on the above-described grain analyzer, and the simulation result may be output to a graphical user interface of the grain analyzer. This allows the user to acquire the quality information with the grain analyzer and also confirm the simulation result at the same time. Alternatively, in a case where the present invention is realized as the simulation apparatus, this simulation apparatus may be an information processing apparatus (for example, a personal computer) with a predetermined program installed therein.

Further, the sorting target 90 is not limited to brown rice, and may be any granular object. The sorting target 90 may be, for example, milled rice, a wheat grain, beans (a soybean, a chickpea, a green soybean, or the like), or resin (a pellet or the like). In this case, the content of the defective product can be defined as appropriate according to the required sorting performance.

DESCRIPTION OF THE REFERENCE NUMERALS

11 conveyance line
12 measurement apparatus
20 sorter
20*a* primary sorting system
20*b* secondary sorting system
21 acceptable product hopper
22 defective product container
23, 24 switching valve
25 controller
31, 32 light source
33, 34 light
41, 42 optical sensor
50 sorting device
51, 51*a*, 51*b*, 51*c* nozzle
52, 52*a*, 52*b*, 52*c* valve
53 air
60 user interface
61 material quality display region
62 target quality input region
63 grade input region
64 mix rate input region
65 estimated value display region
71 storage tank
72 feeder
73 chute
74 acceptable product discharge gutter
75 defective product discharge gutter
80 image
81, 82 pixel
83*a*, 83*b*, 83*c* ejection responsibility range
84*a*, 84*b* overlap region
90, 91, 92 sorting target
95 conveyance route
D1 conveyance direction
D2 perpendicular direction

What is claimed is:
1. An optical sorter comprising:
a light source configured to irradiate a sorting target in transit with light;
an optical sensor configured to detect the light emitted from the light source and associated with the sorting target;
a sorting device configured to sort out at least a part of sorting targets determined to be defective products based on a signal acquired by the optical sensor; and
a controller configured to control an operation of the optical sorter,
wherein the controller is configured to:
receive an input of an initial target quality condition regarding an allowable mix rate of the defective products in sorting targets discharged from the optical sorter as acceptable products;
receive an input of quality information indicating a mix rate of the defective products regarding at least a part of the sorting targets before being sorted out by the sorting device;
simulate, based on the quality information regarding the at least a part of the sorting targets before being sorted out by the sorting device, a sorting result regarding a quantity and/or a yield of sorting targets discharged as the acceptable products that is expected to be acquired when the sorting is conducted by the sorting device so as to achieve the initial target quality condition, and output a result of the simulation;
receive an input of a final target quality condition to be employed when conducting the sorting by the sorting device; and
conduct the sorting based on a sorting control parameter that allows the final target quality condition to be achieved.

2. The optical sorter according to claim 1, wherein the controller is configured to control the sorting device so as to sort out only a part of the sorting targets determined to be the defective products, and
the sorting control parameter includes a setting value regarding a sorting rate, which is a percentage of sorting targets targeted to be sorted out among the sorting targets determined to be the defective products.

3. The optical sorter according to claim 1, wherein the sorting control parameter includes a threshold value for determining the defective products.

4. The optical sorter according to claim 1, wherein the sorting device includes a plurality of nozzles configured to selectively eject the air, and arranged in a direction perpendicular to a conveyance direction of the sorting target,
the sorting device is configured to sort out the at least a part of the sorting targets determined to be the defective products by selectively ejecting the air to the sorting target from the plurality of nozzles,
the controller is configured to be able to variably set a range in which the air is ejected to the sorting target, and
the sorting control parameter includes a setting regarding the range in which the air is ejected.

5. The optical sorter according to claim 1, comprising a primary sorting system and a secondary sorting system,
wherein each of the primary sorting system and the secondary sorting system is configured to conduct optical sorting using the light source, the optical sensor, and the sorting device,
the optical sorter is configured in such a manner that the sorting targets introduced into the primary sorting system are sorted into a first sorted group and a second sorted group, the first sorted group is discharged from the primary sorting system as the acceptable products, the secondary sorted group is introduced into the secondary sorting system, and the second sorted group is sorted into a third sorted group and a fourth sorted group in the secondary sorting system, the optical sorter is further configured to switch a discharge destination of the third sorted group into reintroduction between the primary sorting system and discharge as the acceptable products, and/or is configured to switch a discharge destination of the fourth sorted group between discharge as the acceptable products and discharge as the defective products, and the sorting control parameter includes a setting regarding the discharge destination of the third sorted group and/or the fourth sorted group.

6. The optical sorter according to claim 1, wherein the controller is configured to detect a mix state of the defective products in the sorting targets before being sorted out by the sorting device in a predetermined period based on the signal acquired by the optical sensor and change the sorting control parameter based on the mix state during a sorting operation.

7. The optical sorter according to claim 6, wherein the controller is configured to calculate a sorting result regarding the target quality condition in the predetermined period based on the mix state and change the sorting control parameter based on the calculated sorting result during the sorting operation.

8. The optical sorter according to claim 7, further comprising a primary sorting system and a secondary sorting system, wherein each of the primary sorting system and the secondary sorting system is configured to conduct optical sorting using the light source, the optical sensor, and the sorting device, the optical sorter is configured in such a manner that the sorting targets introduced into the primary sorting system are sorted into a first sorted group and a second sorted group, the first sorted group is discharged from the primary sorting system as the acceptable products, the secondary sorted group is introduced into the secondary sorting system, and the second sorted group is sorted into a third sorted group and a fourth sorted group in the secondary sorting system, the optical sorter is further configured to switch a discharge destination of the third sorted group into reintroduction between the primary sorting system and discharge as the acceptable products, and/or is configured to switch a discharge destination of the fourth sorted group between discharge as the acceptable products and discharge as the defective products, the sorting control parameter includes a setting regarding the discharge destination of the third sorted group and/or the fourth sorted group, and the controller is configured to calculate the sorting result regarding the target quality condition in the predetermined period based on the signal acquired in each of the primary sorting system and the secondary sorting system during the sorting operation.

9. The optical sorter according to claim 7, wherein the controller is configured to change the sorting control parameter in a direction for allowing the calculated sorting result to indicate a quality to closer the final target quality condition when a quality indicated by the calculated sorting result falls below the final target quality condition by a predetermined degree.

10. The optical sorter according to claim 7, wherein the controller is configured to change the sorting control parameter in a direction for improving a yield of the sorting targets discharged as the acceptable products when a quality indicated by the calculated sorting result exceeds the final target quality condition by a predetermined degree.

11. A sorting simulation apparatus comprising:

a controller, wherein the controller is configured to:

receive an input of an initial target quality condition regarding an allowable mix rate of defective products in sorting targets discharged from the optical sorter as acceptable products when sorting the sorting targets using an optical sorter;

receive an input of quality information indicating a mix rate of the defective products regarding at least a part of the sorting targets before being sorted out by the sorting device; and simulate, based on the quality information regarding the at least a part of the sorting targets before being sorted out by the sorting device, a sorting result regarding a quantity and/or a yield of sorting targets discharged as the acceptable products that is expected to be acquired when the sorting is conducted by the optical sorter so as to achieve the initial target quality condition, and output a result of the simulation.

12. An optical sorter comprising:

a light source configured to irradiate a sorting target in transit with light;

an optical sensor configured to detect the light emitted from the light source and associated with the sorting target;

a sorting device configured to sort out at least a part of sorting targets determined to be the defective products based on a signal acquired by the optical sensor; and a controller configured to control an operation of the optical sorter, wherein the controller is configured to:

receive an input of quality information indicating a mix rate of the defective products regarding at least a part of the sorting targets before being sorted out by the sorting device;

for each of a plurality of initial target quality conditions regarding an allowable mix rate of the defective products in sorting targets discharged from the optical sorter as acceptable products, simulate, based on the quality information regarding the at least a part of the sorting targets before being sorted out by the sorting device, a sorting result regarding a quantity and/or a yield of the sorting targets discharged as the acceptable products that is expected to be acquired when the sorting is conducted by the optical sorter so as to achieve the initial target quality conditions;

determine, based on a result of the simulation, a final target quality condition to be employed when conducting the sorting by the sorting device; and conduct the sorting based on a sorting control parameter that allows the final target quality condition to be achieved.

* * * * *